United States Patent
Ueno et al.

(10) Patent No.: US 6,237,036 B1
(45) Date of Patent: May 22, 2001

(54) METHOD AND DEVICE FOR GENERATING ACCESS-CONTROL LISTS

(75) Inventors: Hitoshi Ueno; Kenichi Fukuda; Takafumi Chujo, all of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/218,251

(22) Filed: Dec. 21, 1998

(30) Foreign Application Priority Data

Feb. 27, 1998 (JP) .................................................. 10-048041
Mar. 3, 1998 (JP) .................................................. 10-050838

(51) Int. Cl.⁷ .................................................. G06F 15/173
(52) U.S. Cl. .......................... 709/225; 709/100; 709/223; 709/201
(58) Field of Search ..................................... 709/225, 201, 709/223, 226, 232, 100, 1; 700/1, 83; 705/1, 51, 54; 707/10; 706/45

(56) References Cited

U.S. PATENT DOCUMENTS

| 5,406,477 | * | 4/1995 | Harhen | ................................. 364/401 |
| 5,889,952 | * | 3/1999 | Hunnicutt et al. | .................... 709/219 |
| 6,088,451 | * | 7/2000 | He et al. | ................................. 380/25 |

* cited by examiner

Primary Examiner—Ario Etienne
(74) Attorney, Agent, or Firm—Helfgott & Karas, P.C.

(57) ABSTRACT

A method of generating access-control lists executable by a system and derived from access-control rules supplied for insuring security of an operation system is presented. The method includes the steps of inputting access-manager-type-group information, access-target-type-group information, and organizational-structure information, inputting access-control rules each comprised of an access-manager type, an access-target type, and an action in order to represent security guidelines of the system, inputting constraint conditions relating to the organizational structure of the system, extracting access managers and access targets from the access-manager-type-group information and the access-target-type-group information, respectively, with respect to the access-manager type and the access-target type included in each of the access-control rules, checking the constraint conditions with regard to all the combinations between the extracted access managers and the extracted access targets, and generating access-control lists comprised of such an access manager, an access target, and an action as to satisfy the constraint conditions.

6 Claims, 20 Drawing Sheets

| RESPONSIBILITY ASSIGNMENT | SERVICE MONITORING | NMS-NW MONITORING | NMS-NW CONTROL | NW MONITORING | NW CONTROL |
|---|---|---|---|---|---|
| CUSTOMER-SERVICE STAFF | A | N | N | N | N |
| ASSIGNED-AREA-NMS-MANAGEMENT STAFF | A | A | C1 | N | N |
| ASSIGNED-AREA-NW-MANAGEMENT STAFF | A | A | N | A | C2 |
| SYSTEM-MANAGEMENT STAFF | A | A | A | A | A |

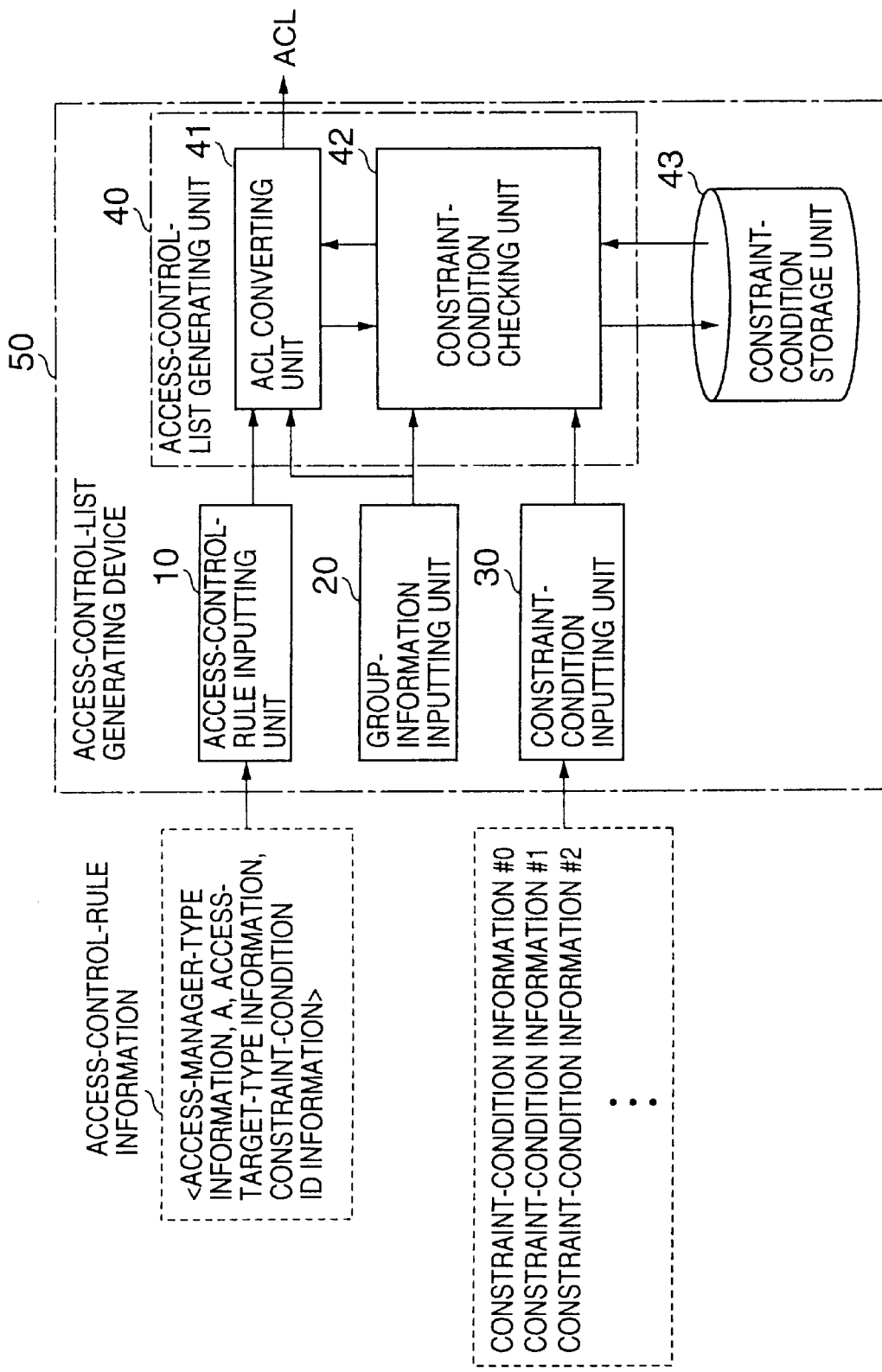

METHOD AND DEVICE FOR GENERATING ACCESS-CONTROL LISTS

BACKGROUND OF THE INVENTION

1. Field of the Invention

The present invention relates to a method of and a device for generating an access-control list, and particularly relates to a method of and a device for generating an access-control list based on inputting of access-control rules so that a system can execute the generated access-control list with an aim of insuring security of the operation system.

Recent increases in diversity of services and severity of competition in the information-communication industry have resulted in more emphasis being placed on enhancement of operation systems so as to satisfy customer needs. In order to promptly respond to the customer needs, networking of operation systems should be extended beyond the framework of a simple network and connection of elements thereof so as to encompass services allowing customers and operators to access information stored in any devices of a service providing system. Along such extension of networking, types of works that operators attend to are diversified, resulting in an expansion in scale and complexity of a network-management system (NMS).

As relations between the NMS and operators become complicated, management of the relations become more and more important. One of the important issues is how to insure security. Namely, security needs to be established and maintained by imposing access controls, which regulate which operator can perform what operations with respect to which network resources or NMS. Such access controls are preferably flexible enough to cope with an expansion of the network, an extension and modification of the NMS, reorganization,

2. Description of the Related Art

FIG. 1 is an illustrative drawing showing relations between NMS networks and operator responsibilities.

In NMS networks, sections which attend to network operations are classified into a plurality of different levels. At the top level, a network-management center has operators working as network-management personnel, NMS-management personnel, system-management personnel, etc., who control network operations nationwide. At the second level from the top, a sub-network-management center has operators working as network-management personnel, NMS-management personnel, customer-service personnel, etc., who control network operations on a regional/prefectural basis. At the bottom level, a regional network (switch-board office) has operators working as system-installation/maintenance personal and so on. Such NMS networking as described above makes it possible for the operators to access various NMSs and network resources.

As the NMS networking diversifies operator responsibilities, it becomes increasingly important to manage the relations between the NMS/network resources and the operators. One of the important issues is the management of operator authority.

Operator authority is generally determined based on:
a) position titles (e.g., service-maintenance staff, nationwide-NMS-management staff, and so on);
b) organizational structures (e.g., responsible for network-element maintenance within an assigned area, responsible for NMS management within offices, and so on);
c) property of managed objects (e.g. responsible for management of paths crossing area borders).

Relations between the authority and the NMS/network resources can be managed by imposing access control which is executable by the operation system. However, operability in maintenance of access-control rules, which forms a basis of the access control, is an issue that needs to be attended to. Also, performance of the access control on a distributed system and an influence on the operator operations are other issues that needs to be attended to.

FIG. 2A is a table chart showing access-control guidelines (security guidelines) which forms a basis of the access-control rules.

A table of FIG. 2A shows relations between job assignment and responsibility (accessible information). In the figure, the symbol "A" indicates an "authorized" status, and the symbol "N" signifies a "non-authorized" status. Further, the symbol "Cn" indicates restrictions attached to the access-control rules. For example, "C1" means that access is authorized only when a managed object is placed within the assigned area. Also, "C2" means that access is authorized only when the managed object is in the assigned area or resides across the boundary between the assigned area and another area.

According to the access-control guidelines shown in FIG. 2A, the system-management staff can access all the managed objects. The assigned-area-NW-management staff cannot attend to the NMS-NW control (network control relating to the NMS), but can attend to the NW control within the assigned area and across borders between the assigned area and another area. Further, the assigned-area-NMS-management staff cannot handle the NW control and the NW monitoring, but can attend to the NMS-NW control within the assigned area and across borders between the assigned area and another area. The customer-service staff can only handle service monitoring which relates to customers.

Such access-control guidelines as described above is manually converted into a description describing the access control rules that are executable by the system, and, then , is input to the system.

In this case, relations between managers and managed objects in a distributed management system needs to be controlled. Management policy is a scheme that achieves this objective (M. Sloman, "policy Driven Management for Distributed Systems", Journal of Network and Systems Management, Vol. 2, pp. 333–360, 1994, a disclosure of which is hereby incorporated by reference).

Management policy includes two types policies. One is authorization policy which relates to authorization of message exchange, and the other is obligation policy which relates to obligation of message exchange. Here, a close look is taken at the authorization policy since it directly relates to the access control.

The authorization policy can describe a group of manager objects (i.e., a manager domain), a group of a managed-target objects (i.e., a target domain), a set of operation messages exchanged between the manager domain and the target domain, constraint conditions imposed upon exchange of messages, etc. The following is a syntax of an authorization policy.

["A+"|"A–"]Manager"{"Action"}"Target when Condition Here, "A+" is an authorization policy, and "A–" is a negative authorization policy. "Manager" and "Target" are domain names. "Action" is a message name, and "Condition" is a description regarding restrictions.

In what follows, examples of descriptions of authorization policies (access-control rules) will be shown.

A+ John{subscribe}bridge_failure_event

This authorization policy (A+) describes that John can subscribe a failure event that occurs in a bridge device.

A− Students{reboot}teaching_workstations

This negative authorization policy (A−) describes that students cannot reboot workstations that are provided for educational purposes.

A+ x:Managers{read}development_directory
   when x.location=planning_office

This authorization policy (A+) has a constraint condition attached thereto, and describes that manager x can read a development directory only when manager x is in a planning office.

In this manner, access-control rules based on the management policy permits use of constraint conditions (C:Condition). In general, however, a machine process for recognizing the constraint conditions involves complex tasks, and is a rather difficult process. Because of this, an interpreter which generates an access-control list (ACL) executable by the system does not actually translate the constraint conditions C attached to the access-control rules. The constraint conditions C are merely permitted to accompany the access-control rules.

FIG. 2B is an illustrative drawing showing an example of an organizational structure of an NMS network system.

In FIG. 2B, an access manager 2 belongs a division 1, and is a transmission-line operator. An access target 1 is under the control of the division 1, and is a service-management device. An access manager 3 belongs a division 2, and is a transmission-line operator. An access target 2 is under the control of the division 2, and is a service-management device.

Access-control guidelines for the NMS network system described above may permit the manager 2 of the division 1 to access the target 1 of the division 1, and may permit the manager 3 of the division 2 to access the target 2 of the division 2.

When the access-control guidelines as described above need to be described as authorization policies, access-control rules need to be written down by a pen and paper by examining the organizational chart of FIG. 2B, describing various actions A with respect to each manager (name) and each target (device) as follows.

Manager 2 A+ Object 1
Manager 3 A+ Object 2

This is how the management policy of the related art is processed.

In the related art, a concept "role" is utilized when describing the management policy (E. Lupu, D. Marriott, M. Sloman, N. Yialelis, "A Policy Based Role Framework for Access Control", First ACM/NIST Role Based Access Control Workshop, December 1995, a disclosure of which is hereby incorporated by reference).

The concept "role" models responsibilities and duties associated with a position within an organization. Access managers are grouped by roles with an aim of simplifying descriptions of access-control rules. In the following, access control based on this concept "role" will be described.

FIG. 3 is an illustrative drawing showing access control using the role.

A manager 2 sends an action A1 to a target 1. In this case, an access-control operation unit 62 obtains identify information from a role table so as to learn that the manager 2 is a transmission-line operator and the target 1 is a service-management device. Further, the access-control operation unit 62 attends to access control based on whether an access-control-rule table includes an access-control rule:

<transmission-line operator, A1, service-management device>.

In this case, a person who makes the rules may describe the following access-control rules, for example.

<transmission-line operator, A1, service-management device>

<switch-board operator, A2, traffic-management device>

In this manner, use of roles eliminates a need to describe a large number of access-control rules defining actions with respect to each manager and each target. This reduces the load on the person who describes the rules.

The person who describes rules may, of course, describe constraint conditions. However, there is no technology available yet for interpreting constraint conditions directly from access-control rules. Because of this, even when a constraint condition:

<transmission-line operator, A1, service-management device, manager's organization=organization which controls the target> needs to be described, the person who describes rules cannot just write this down and leave it as it is. Rather, the person who describes rules needs to write down and repeat a description of access-control rules as many times as the number of organizations as in the following.

<transmission-line operator with organization 1, A1, service-management device of organization 1>

<transmission-line operator with organization 2, A1, service-management device of organization 2>

This means that there is a need to describe a large number of access-control rules.

Use of the concept "role" as described above may make it possible to convert an access-control rules as originally input into an access-control list executable by the system. What will be described in the following is not known to others or used by others, and, thus, does not constitute prior art. The following description is provided because of its significance in helping to understand the concept "role".

FIG. 4 is an illustrative drawing for explaining an exemplary method of generating an access-control list using roles.

A system shown in FIG. 4 includes a role table 72 and a target table 73. The role table 72 relates access-manager types (roles) to individual access managers (staff names) who belong to respective roles. The target table 73 relates access-target types to individual access targets which belong to respective types. Access-control rules in this case are described by the management policy <M, A, T, C>

The person who describes rules can create the following access-control rules, for example, by using the organizational structure shown in FIG. 2.

<transmission-line operator, A1, service-management device, C1>

<switch-board operator, A2, traffic-management device, C2>

A access-control-list generating unit 71 refers to the role table 72 and the target table 73 based on the input access-control rules, and generates an access-control list comprised of three items <M, A, T>, i.e., an access manager M, an action A, and an access target T.

The access-control list (ACL) is input to the access-control-operation unit of the system, and describes which method/command is permitted with respect to which access manager and which access targets. Such a description is provided in the three-item form <M, A, T>.

Even in this case, constraint conditions C1 and C2 that are attached to the access-control rules are permitted to be part of descriptions, but are not used in generating the access-control list. As a result, the access-control rule of this example:

<transmission-line operator, A1, service-management device, C1>generates a relation:

<transmission-line operator (manager 1, manager 2), A1, service-management device (target 1, target 2)>, and, then, further generates four access-control lists as follows.

1) <manager 2, A1, target 1>
2) <manager 2, A1, target 2>
3) <manager 3, A1, target 1>
4) <manager 3, A1, target 2>

As can be understood, the lists 1) and 4) are in accordance with the access-control guidelines. The generated results, however, include the lists 2) and 3) which are not in compliance with the access-control guidelines. That is, the list 2) indicates that the manager 2 of the division 1 can access the target 2 of the division 2, which is a false. Also, the list 3) shows that the manager 3 of the division 2 can access the target 1 of the division 1, which is not true.

In this manner, the management-policy scheme and the role scheme of the related art allow constraint conditions to be described as part of the access-control rules. These constraint conditions, however, are not interpreted by the access-control-list generating unit or the access-control operation unit, so that the person who makes the rules needs to write down a large number of descriptions of access-control rules defining actions with respect to individual managers, targets, and/or organizations.

Even if the concept "role" is utilized in an attempt to convert access-control rules into access-control lists, constraint conditions attached to the access-control rules are disregarded when translating the rules into the access-control list. Because of this, the access-control list thus generated may include lists which are not in compliance with the access-control guidelines of the system. Elimination of the non-complying access-control lists requires a significant amount of time and labor.

Further, when a change is made to a configuration of the operation system or security policies, such as when there is an expansion of the network, a change in organizations where access managers belong, a change in authorization, a change in organizations controlling access targets, or the like, it becomes necessary to input another set of access-control rules by taking into account various constraint conditions in existence between the organizations where access managers belong and the organizations which control the access targets. According to the related-art scheme described above, however, the person who makes the rules needs to consider both the access-control rules and the constraint conditions imposed by the organizational structure, so that it is extremely difficult for him/her to identify every change that needs to be made. Further, the amount of data input (i.e., the amount of labor) necessary for describing access-control rules is unduly increased.

Accordingly, there is a need for a method of and a device for generating access-control lists wherein the method and the device allows access-control rules to be easily constructed and modified.

SUMMARY OF THE INVENTION

Accordingly, it is a general object of the present invention to provide a method and a device for generating access-control lists which satisfy the need described above.

It is another and more specific object of the present invention to provide a method of and a device for generating access-control lists wherein the method and the device allows access-control rules to be easily constructed and modified.

In order to achieve the above objects according to the present invention, a method of generating access-control lists executable by a system and derived from access-control rules supplied for insuring security of an operation system includes the steps of a) inputting, in a memory, access-manager-type-group information which defines relations between access managers of the system and access-manager types, access-target-type-group information which defines relations between access targets of the system and access-target types, and organizational-structure information which defines an organizational structure of the system encompassing organizations to which the access managers and the access targets belong, b) inputting, in the memory, access-control rules, each of which is comprised of an access-manager type, an access-target type, and an action in order to represent security guidelines of the system, c) inputting, in the memory, constraint conditions relating to the organizational structure of the system, d) extracting access managers and access targets from the access-manager-type-group information and the access-target-type-group information, respectively, with respect to the access-manager type and the access-target type included in each of the access-control rules, e) extracting, from the organizational-structure information, first locations of first organizations and second locations of second organizations to which the extracted access managers and the extracted access targets belong, respectively, f) checking the constraint conditions with regard to all combinations between the first locations and the second locations, and g) generating access-control lists which are comprised of such an access manager, an access target, and an action as to satisfy the constraint conditions.

In the method described above, the present invention incorporates the organizational-structure information and constraint conditions regarding the organizational structure into the system, and the system attends to data processing regarding the constraint conditions imposed on rules in connection with the organizational structure. With this configuration, the present invention can automatically generate access-control lists satisfying the constraint conditions by automatically interpreting the constraint conditions, thereby significantly reducing the load imposed on a person who makes the rules.

When changes are made to the organizational structure of the NMS, it is sufficient to make correction to the organizational-structure information, and there is no need to generate another set of access-control rules all over again. In response to the change in the organizational-structure information, the access-control lists will be readily regenerated.

When there is a change in the security guidelines of the NMS, there is no need to regenerate the access-control rules. Rather, it is sufficient to make correction only to the constraint conditions in order to regenerate the access-control lists.

The same objects are achieved by a device for generating access-control lists executable by a system and derived from access-control rules supplied for insuring security of an operation system. The device includes a group-information inputting unit which inputs, in a memory, access-manager-type-group information defining relations between access managers of the system and access-manager types, access-target-type-group information defining relations between access targets of the system and access-target types, and organizational-structure information defining an organizational structure of the system encompassing organizations to which the access managers and the access targets belong, an access-control rule inputting unit which inputs, in the memory, access-control rules, each of which is comprised of an access-manager type, an access-target type, and an action in order to represent security guidelines of the system, a constraint-condition inputting unit which inputs, in the memory, constraint conditions relating to the organizational structure of the system, an access-control-list generating unit which extracts access managers and access targets from the access-manager-type-group information and the access-target-type-group information, respectively, with respect to the access-control rules, and checks the constraint conditions with regard to all combinations between the extracted access managers and the extracted access targets so as to generate access-control lists comprised of such an access manager, an access target, and an action as to satisfy the constraint conditions.

According to one aspect of the present invention, the device as described above is such that said access-control-list generating unit includes an access-control-list converting unit which extracts access managers and access targets from the access-manager-type-group information and the access-target-type-group information, respectively, such that the extracted access managers and the extracted access targets belong to the access-manager type and the access-target type, respectively, included in each of the access-control rules, and generates access-control lists comprised of such an access manager, an access target, and an action as to satisfy the constraint conditions, and a constraint-condition checking unit which extracts, from the organizational-structure information, first locations of first organizations and second locations of second organizations to which the extracted access managers and the extracted access targets belong, respectively, and checks the constraint conditions with regard to all combinations between the first locations and the second locations so as to select combinations satisfying the constraint conditions and inform said access-control-list converting unit of the selected combinations.

According to another aspect of the present invention, the device as described above further includes a constraint-condition storing unit which stores a plurality of constraint conditions in advance, wherein said access-control-list inputting unit allows the constraint conditions stored in advance to be specified as part of the access-control rules, the constraint conditions so specified being checked.

According to another aspect of the present invention, the device as described above further includes a constraint-condition storing unit which stores a plurality of organizational structures in advance, wherein said access-control-list inputting unit allows the organizational structures stored in advance to be specified as part of the access-control rules, the constraint conditions being checked with respect to the organizational structures so specified.

According to another aspect of the present invention, the device as described above further includes a conversion-rule inputting unit which inputs format-conversion rules of the access-control lists in the memory, and a format converting unit which converts a format of the access-control lists generated by the access-control-list generating unit according to the format-conversion rules stored in the memory.

Other objects and further features of the present invention will be apparent from the following detailed description when read in conjunction with the accompanying drawings.

BRIEF DESCRIPTION OF THE DRAWINGS

FIG. 11 is a block diagram showing functional elements of a third embodiment of the access-control-list generating device according to the present invention;

DESCRIPTION OF THE PREFERRED EMBODIMENTS

In the following, a principle and embodiments of the present invention will be described with reference to the accompanying drawings.

Figure 5:
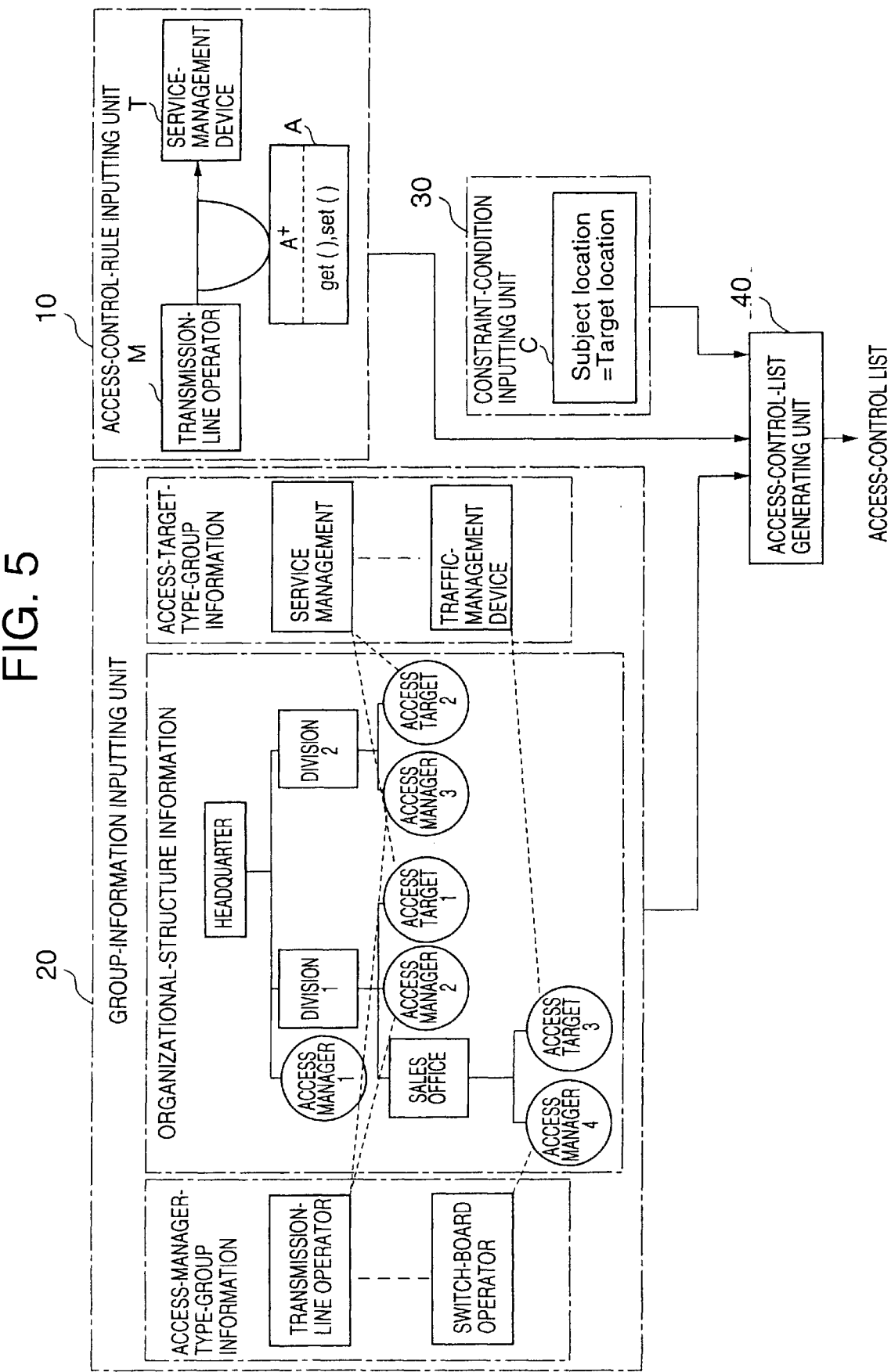
FIG. 5 is an illustrative drawing showing a system configuration according to a principle of the present invention.

FIG. 5 is an illustrative drawing showing a system configuration according to a principle of the present invention.

A method of generating access-control lists according to the present invention generates access-control lists executable by the system based on access-control rules which are supplied for the purpose of insuring security of the operation system. The method of generating access-control lists includes the steps of:

a) inputting, in a memory, access-manager-type-group information which defines relations between access managers (managers 1 through 4) of the system and access-manager types (transmission-line operator and switch-board operator), access-target-type-group information which defines relations between access targets (targets 1 through 3) and access-target types (service-management device and traffic-management device), and organizational-structure information which defines an organizational structure of an organization to which the access managers and targets belong;

b) inputting, in the memory, access-control rules, each of which is comprised of three items including an access-manager type, an access-target type, and an action (i.e., get, set, etc.) in order to represent security guidelines of the system;

c) inputting constraint-condition information in the memory based on the organizational structure of the system;

d) extracting information on access managers (managers 2 and 3/4) and information on access targets (targets 1 and 2/3) from the access-manager-type-group information and the access-target-type-group information, respectively, with respect to the access-manager type and the access-target type included in the access-control rules;

e) extracting first locations and second locations to which the access managers and the access targets belong, respectively, from the organizational-structure information based on the information on the access managers and the access targets;

f) checking the constraint conditions with regard to all the combinations between the first locations and the second locations; and g) generating access-control lists which are comprised of such three items including an access manager, an access target, and an action as to satisfy the constraint conditions.

In FIG. 5, the organizational structure of the system is defined by a program list employing a tree-structure scheme so that hierarchical structure of the NMS are shown from the top to the bottom. i.e., from the headquarter, the division 1, the division 2, to the sales office. In this example, the access manager 1 belongs to the headquarter, and the access managers 2 and 3 belong to the divisions 1 and 2, respectively. Also, the access manager 4 belongs to the sales office of the division 1. The access targets 1 and 2 are under the control of the divisions 1 and 2, respectively. Further, the access target 3 is controlled by the sales office of the division 1. All of these relations between the access managers/targets and the locations to which they belong are retained by the program list.

The constraint condition C can represent various relations regarding the locations to which the access managers and the access targets belong. For example, a given constraint condition may represent that the location (division 1) of an access manager is the same as the location (division 1) of an access target, or may represent that the location (sales office of the division 1) of an access target belongs to the location (division 1) of an access manager.

In the following, a detailed description will be given with respect to a case in which an access-control rule <a transmission-line operator can access a service-management device> is input in the memory at the step b) described above, and, further, a constraint condition <a location of an access manager is the same as a location of an access target> is input in the memory at the step c).

At the step d), information on access managers (managers 2 and 3) and information on access targets (targets 1 and 2) are extracted from the access-manager-type-group information and the access-target-type-group information, respectively, with respect to the access-manager type (transmission-line operator) and the access-target type (service-management device) included in the access-control rule.

At the step e), first locations (divisions 1 and 2) and second locations (divisions 1 and 2) to which the access managers and the access targets belong, respectively, are extracted from the organizational-structure information based on the extracted information about the access managers and the access targets.

At the step f), the constraint condition identified above is checked with respect to all the combinations between the first locations and the second locations. These combinations include the following.

division 1 (manager 2) and division 1 (target 1)
division 1 (manager 2) and division 2 (target 2)
division 2 (manager 3) and division 1 (target 1)
division 2 (manager 3) and division 2 (target 2)

The constraint condition identified above states:
<a location of an access manager is the same as a location of an access target>,
so that combinations satisfying this constraint condition are as follows.

division 1 (manager 2) and division 1 (target 1)
division 2 (manager 3) and division 2 (target 2)

At the step g), access-control lists which are comprised of such three items including an access manager, an access target, and an action as to satisfy the constraint condition are generated. Namely, the following rules are generated in this case.

<manager 2, A+, target 1>
<manager 3, A+, target 2>

The constraint condition identified above may be supplied as part of each access-control rule. If the constraint condition is input separately from the access-control rules as described above, however, it would suffice to input the constraint condition only once, and the constraint condition is subjected to shared use by a plurality of access control rules.

As described above, the present invention incorporates the organizational-structure information and constraint conditions regarding the organizational structure into the system, and the system attends to data processing regarding the constraint conditions imposed on rules in connection with the organizational structure. With this configuration, the present invention can automatically generate access-control lists satisfying the constraint conditions by automatically interpreting the constraint conditions, thereby significantly reducing the load imposed on the person who makes the rules.

When changes are made to the organizational structure of the NMS, it is sufficient to make correction to the organizational-structure information, and there is no need to generate another set of access-control rules all over again. In response to the change in the organizational-structure information, the access-control lists will be readily regenerated.

When there is a change in the security guidelines of the NMS, there is no need to regenerate the access-control rules. Rather, it is sufficient to make correction only to the constraint conditions in order to regenerate the access-control lists.

The above description has been given with regard to the method of generating access-control lists. In the following, a device for generating access-control lists will be described with reference to FIG. 5.

A device for generating access-control lists according to the present invention generates access-control lists executable by the system based on access-control rules input to the system when these rules are input with an aim of insuring security of the operation system. The device includes a group-information inputting unit 20 which inputs, in a memory, access-manager-type-group information defining relations between access managers of the system and access-manager types, access-target-type-group information defining relations between access targets and access-target types, and organizational-structure information defining an organizational structure of an organization to which the access managers and targets belong. The device further includes an access-control-rule inputting unit 10 which inputs, in the memory, access-control rules, each of which is comprised of three items including an access-manager type, an access-target type, and an action in order to represent security guidelines of the system. Also, the device includes a constraint-condition inputting unit 30 which inputs constraint-condition information in the memory based on the organizational structure of the system. The device further includes an access-control-list generating unit 40 which extracts information on access managers and information on access targets from the access-manager-type-group information and the access-target-type-group information, respectively, with respect to the access-manager type and the access-target type included in the access-control rules, and checks the constraint conditions with regard to all combinations by referring to the organizational-structure information so as to generate access-control lists which are comprised of three items, i.e., an access manager, an access target, and an action satisfying the constraint conditions.

In this manner, an access-control-list generating device 50 is implemented so as to permit easy generation and modification of the access-control rules.

According to one aspect of the present invention, preferably, the access-control-list generating unit 40 includes an access-control-list converting unit 41 and a constraint-condition checking unit 42. The access-control-list converting unit 41 extracts information on access managers and information on access targets from the access-manager-type-group information and the access-target-type-group information, respectively, when the access managers and the access targets belong to the access-manager type and the access-target type, respectively, included in the access-control rules. The access-control-list converting unit 41 further requests the constraint-condition checking unit 42 to check the constraint conditions. After these operations, the access-control-list converting unit 41 generates access-control lists, each of which includes three items, i.e., an access manager, an access target, and an action, satisfying the constraint condition. The constraint-condition checking unit 42 extracts locations of organizations from the organizational-structure information by using the information on the access manager and the information on the access target when the access managers and/or targets belong to these organizations. Further, the constraint-condition checking unit 42 selects combinations which satisfy the constraint conditions from all the combinations, and notifies the access-control-list converting unit 41 of these selected combinations.

According to the device described above, in addition to the access-control-list generating device having a related-art configuration, only the group-information inputting unit 20, the constraint-condition inputting unit 30, and the constraint-condition checking unit 42 need to be newly provided, and, also, the access-control-list converting unit of the related-art configuration needs to be modified to have an interface unit for exchanging data with the constraint-condition checking unit 42. In this manner, the access-control-list generating device 50 is implemented so as to permit easy creation and modification of the access-control rules.

According to another aspect of the present invention, preferably, a constraint-condition storage unit 43 is provided for the purpose of storing a plurality of constraint conditions in advance, and the access-control-rule inputting unit 10 has such a configuration as to allow a constraint condition to be specified as part of an access-control rule. When the constraint conditions are checked, constraint conditions specified (selected) among the plurality of constraint conditions stored in advance are used.

According to the configuration described above, a plurality of constraint conditions #0, #1, . . . , are stored in a memory in advance, and each of the access-control rules allows a constraint condition to be specified (selected) in such form as <M1, A1, T1, C#0>, <M2, A2, T2, C#1>, or the like. This configuration provides a means to easily cope with a complex set of security policies.

According to another aspect of the present invention, preferably, an organizational-structure-information storage unit 44 is provided for the purpose of storing a plurality of organizational structures in advance, and the access-control-rule inputting unit 10 has such a configuration as to allow an organizational structure to be specified as part of an access-control rule. When the constraint conditions are checked, organizational structures specified (selected) among the plurality of organizational structures stored in advance are used.

According to the configuration described above, a plurality of organizational structures #0, #1, . . . , are stored in a memory in advance, and each of the access-control rules allows an organizational structure to be specified (selected) in such form as <M1, A1, T1, K#0>, <M2, A2, T2, K#1), or the like. This configuration provides a means to easily cope with a complex set of organizational structures.

Further, this configuration may be used along with the previously-described configuration which allows a constraint condition to be specified as part of an access-control rule by storing a plurality of constraint conditions in advance. In this case, a complex set of security policies and organizational structures can be easily dealt with.

According to another aspect of the present invention, preferably, a conversion-rule inputting unit 46 and a format converting unit 47 may be provided. The conversion-rule inputting unit 46 stores format-conversion rules of access-control lists in a memory, and the format converting unit 47 converts the format of access-control lists generated by the access-control-list generating unit 40 by using the format-conversion rules stored in the memory.

According to the configuration described above, access-control lists having appropriate formats can be supplied to access-control-operation units, so that these lists are interpreted and executed according to the correct format when the access-control-operation units are provided as part of a disturbed system, and require different formats for the interpretation and execution of the access-control lists.

Further, according to another aspect of the present invention, a format-conversion-rule storage unit may be provided for the purpose of storing a plurality of format-conversion rules, and the access-control-rule inputting unit 10 has such a configuration as to allow a format-conversion rule to be specified as part of or as a part separate from an access-control rule. When access-control lists are to be generated, access-control lists output from the access-control-list converting unit 41 may have formats thereof converted according to the format-conversion rules specified as described above.

In the following, preferred embodiments of the present invention will be described with reference to the accompanying drawings. Throughout these drawings, the same elements or equivalent elements are referred to by the same numerals.

Figure 6:
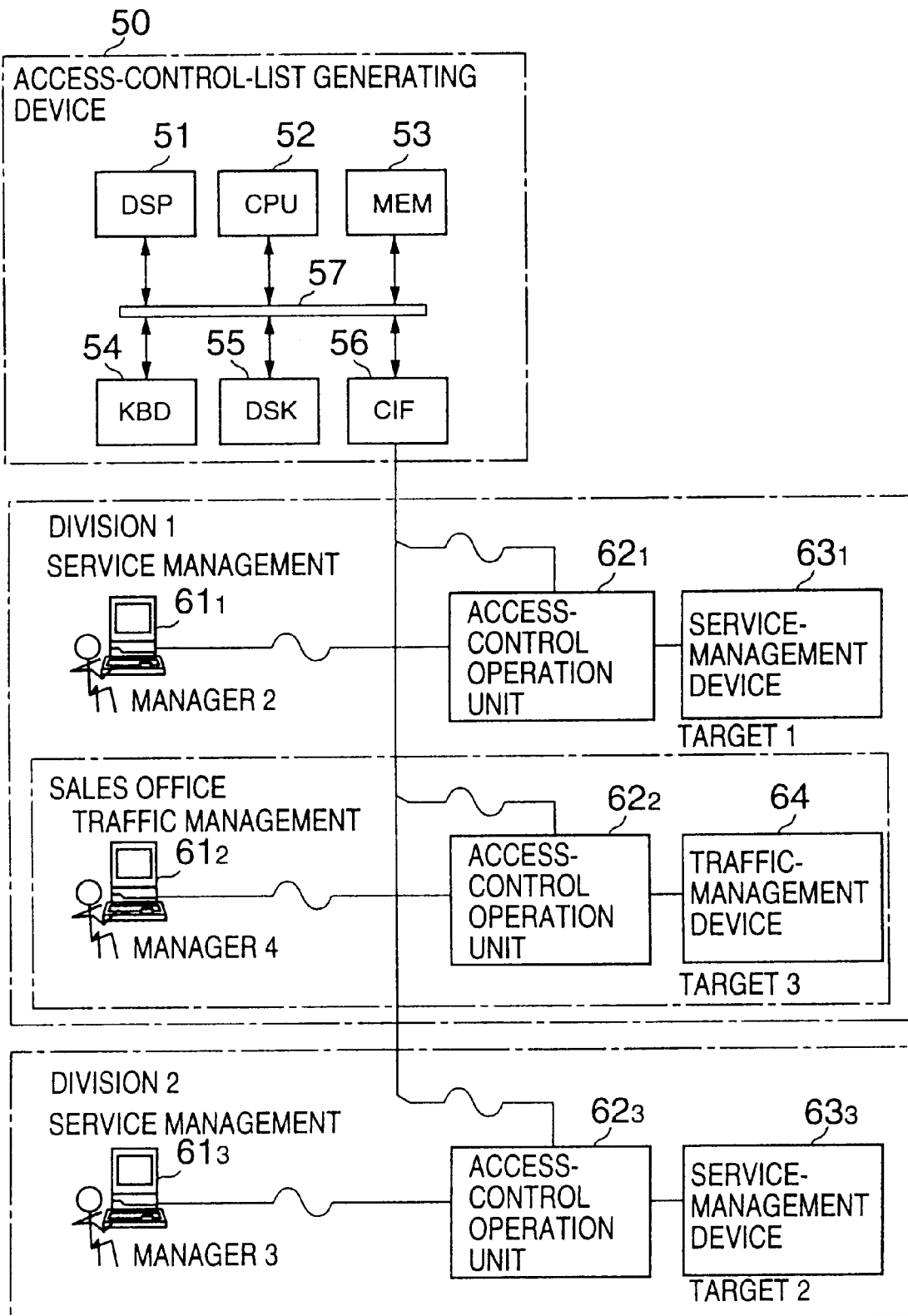
FIG. 6 is an illustrative drawing partially showing a configuration of an access-control-management system according to an embodiment of the present invention.

FIG. 6 is an illustrative drawing partially showing a configuration of an access-control-management system according to an embodiment of the present invention.

The system of FIG. 6 includes an access-control-list generating device 50 according to the present invention. The access-control-list generating device 50 includes a display unit (DSP) 51, a CPU 52, a main memory (MEM) 53, a keyboard (KBD) 54, a disk drive (DSK) 55, a communication-interface unit (CIF) 56, and a bus 57. The display unit 51 displays various information relating to generation of access-control lists and delivery thereof to a distributed system. The CPU 52 attends to overall control and data processing of the access-control-list generating device. The main memory 53 is comprised of RAM, ROM, EEPROM, or the like to store various programs to be executed by the CPU 52 and various data (access-manager/target-type-group information, organizational-structure information, access-control rules, constraint conditions, etc.) processed by the CPU 52. The keyboard 54 is used for inputting the various data as described above as well as control commands or the like. The disk drive 55 includes a floppy-disk drive, a hard drive, and/or the like. The communication-interface unit 56 serves to deliver the access-control lists to various parts of the distributed system. The bus 57 is a common bus attached to the CPU 52.

The keyboard 54 includes a pointing device such as a mouse (not shown). The group information, the access-control rules, the constraint conditions, etc., can be input from the keyboard 54. In a typical operation, however, they are stored in the disk drive 55 as data files in advance, and are loaded therefrom to the main memory 53 when necessary.

The organizational structure of the NMS may be the same as that shown in FIG. 5. The access-control-list generating device 50 may be installed in the headquarter. The divisions 1 and 2 and the sales office of the division 1 attend to the network operations (e.g., transmission/exchange services) corresponding to their own hierarchical level. In the divisions 1 and 2, respectively, the managers 2 and 3 are in charge of service management/control. The manager 4 at the sales office of the division 1 is in charge of traffic management/control. Each manager is given an authority in compliance with the security guidelines of the system so as to be able to access targets (e.g., a service-management device 63 and a traffic-management device 64) according to the given authority.

The access-control operation unit 62 is situated between the access manager (workstation 61) and the access target (service-management device 63 or traffic-management device 64), and attends to actual access control of the distributed system according to the access-control lists ACL. As previously described, the access-control lists are generated in accordance with the security guidelines of the system and delivered to various parts of the system.

In detail, the access manager 2 of the division 1 enters his name "Mr.Yamada", for example, at the time of a login operation at the workstation $61_1$. The access-control operation unit $62_1$ then attends to access control as to whether to accept/deny each message subsequently generated by the access manager 2 (workstation $61_1$) in accordance with the access-control list <M (Yamada), A, T (service-management device $63_1$)>, which is generated by the access-control-list generating device 50.

Figure 7:
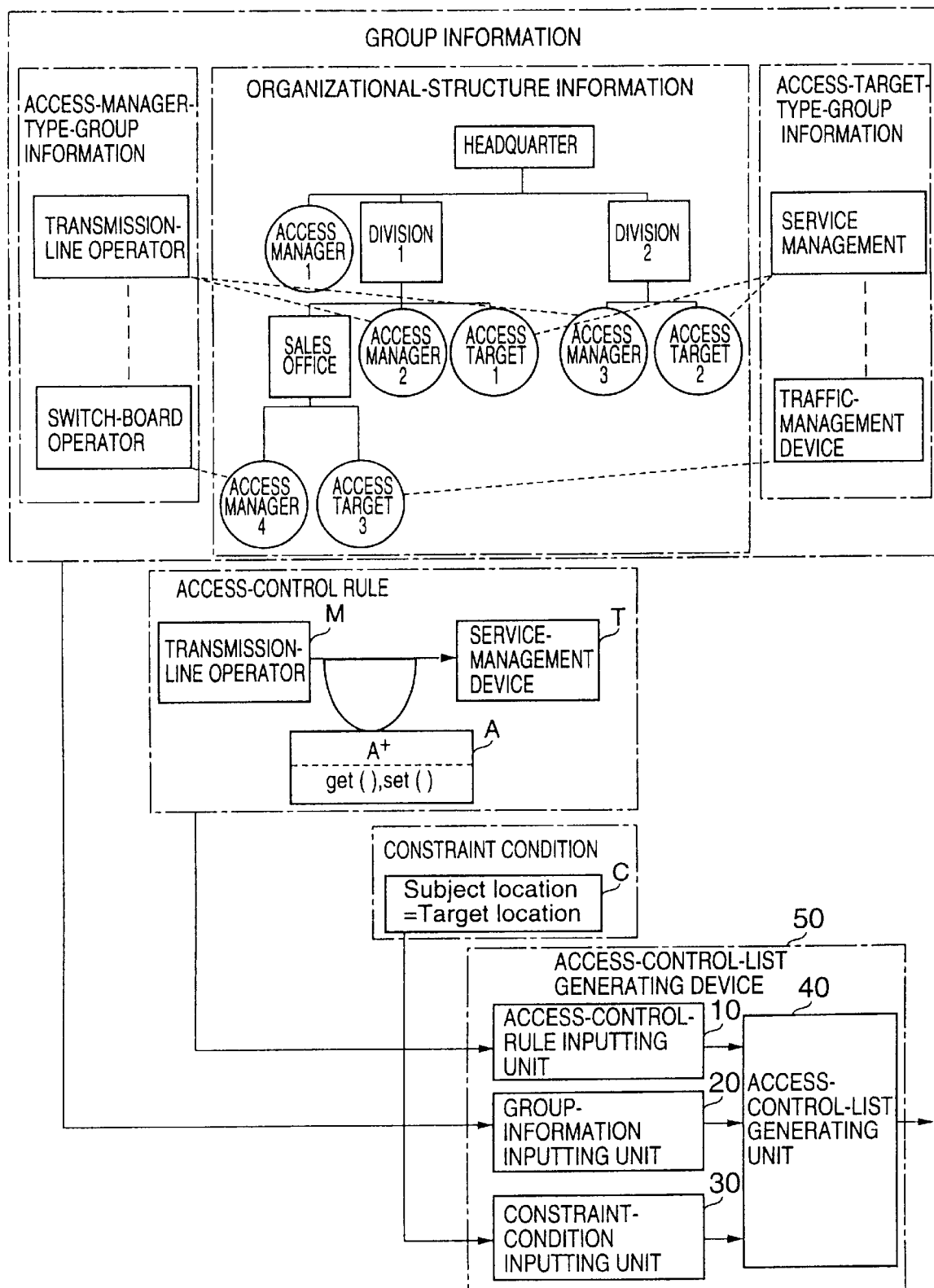
FIG. 7 is a block diagram showing functional elements of a first embodiment of an access-control-list generating device according to the present invention.

FIG. 7 is a block diagram showing functional elements of a first embodiment of the access-control-list generating device according to the present invention. In the figure, the access-control-list generating unit 40 converts access-control rules provided as input into access-control lists, and checks the constraint conditions.

FIG. 7 shows the access-control-list generating device 50, the access-control-rule inputting unit 10, the group-information inputting unit 20, the constraint-condition inputting unit 30, and the access-control-list (ACL) generating unit 40.

The group-information inputting unit 20 stores in the main memory 53 access-manager-type-group information defining relations between access managers of the system and access-manager types, access-target-type-group information defining relations between access targets of the system and access-target types, and organizational-structure information defining an organizational structure of an organization to which the access managers and targets belong.

In what follows, an example of the access-manager-type-group information will be shown with regard to how each item of the information is stored.

access-manager-type-group information:
        <transmission-line operator, switch-board operator>
    transmission-line operator: <manager 2, manager 3>switch-board operator: <manager 4>

The following is an example of how each item of the access-target-type-group information is stored in the memory.

access-target-type-group information:
        <service-management device, traffic-management device>
    service-management device: <target 1, target 2>
    traffic-management device: <target 3>

Further, the following is an example of how each item of the organizational-structure information of the system is stored in the memory.

headquarter: <division 1, division 2>
        headquarter controls divisions 1 and 2
    division 1: <sales office>
        division 1 has a sales office
    division 1: <manager 2, target 1>
        manager 2 and target 1 belong to division 1
    division 2: <manager 3, target 2>
    sales office: <manager 4, target 3>

The group information as described above can be regarded as data definitions which provide concise models regarding how the person who makes the rules views the system.

The access-control-rule inputting unit 10 stores security guidelines of the system in the memory by using access-control rules including three items, the access-manager type (M), the access-target type (T), and the action (A). For example, a rule:

<transmission-line operator, A, service-management device> is input.

The constraint-condition inputting unit 30 stores constraint conditions in the memory when the constraint conditions are represented in terms of the organizational structure of the system. For example, a condition:

<location of access manager=location of access target> is input.

The access-control-list generating unit 40 extracts information on access managers and information on access targets from the access-manager-type-group information and the access-target-type-group information, respectively, with respect to the access-manager type and the access-target type included in the access-control rules, and checks the constraint conditions with regard to all combinations by referring to the organizational-structure information so as to generate access-control lists which are comprised of three items, i.e., an access manager, an access target, and an action satisfying the constraint conditions. In the following, a process of generating ACLs will be described in detail.

Figure 8:
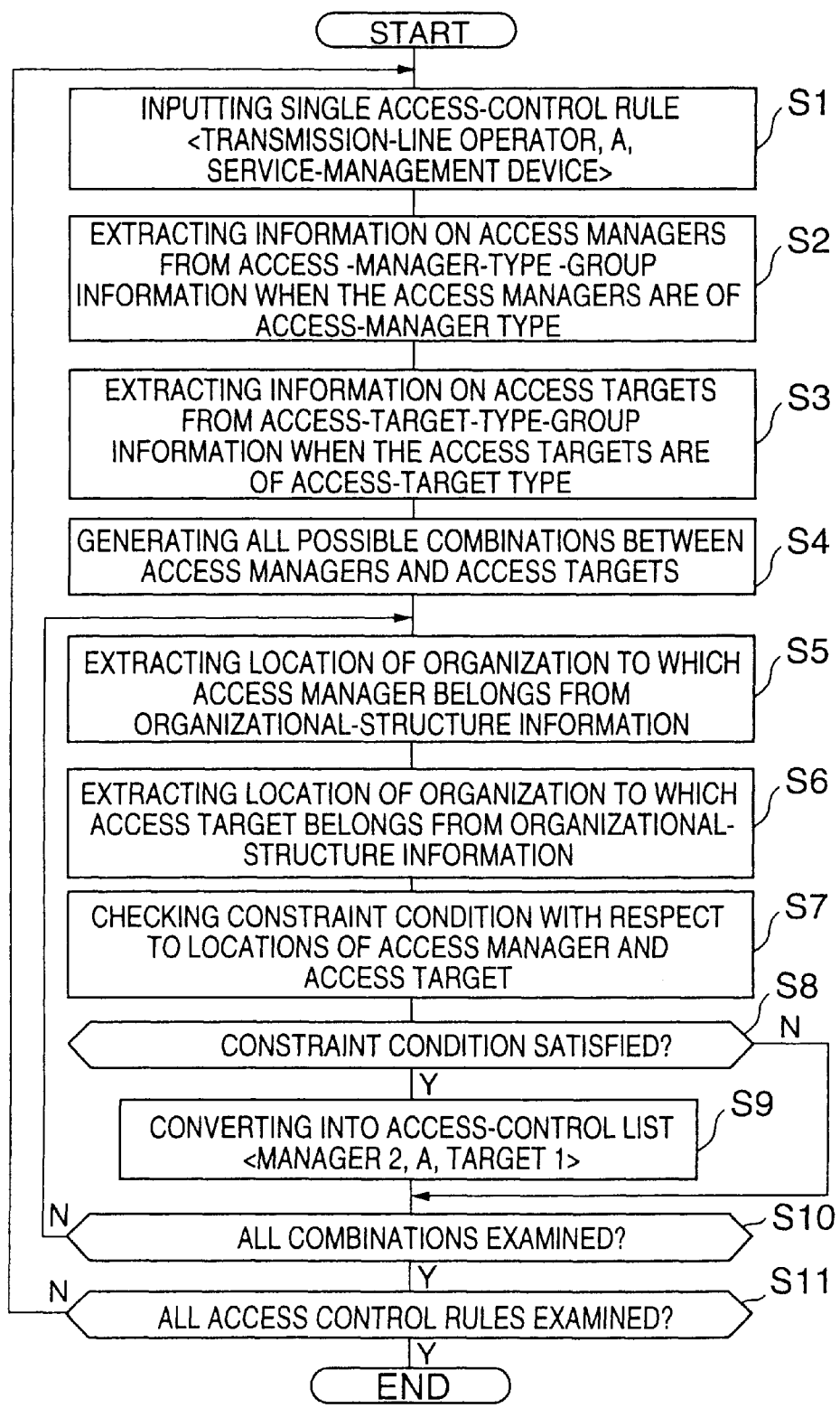
FIG. 8 is a flowchart of a process of generating ACLs according to the first embodiment of the present invention.

FIG. 8 is a flowchart of the process of generating ACLs according to the first embodiment of the present invention.

At a step S1, a single access-control rule:

<transmission-line operator, A, service-management device> is input or selected form a list of access-control rules stored in the memory.

At a step S2, information on all the access managers (manager 2, manager 3) is extracted from the access-manager-type-group information with respect to the access-manager type (i.e., transmission-line operator) included in the access-control rule.

At a step S3, information on all the access targets (target 1, target 2) is extracted from the access-target-type-group information with respect to the access-target type (i.e., service-management device) included in the access-control rule.

At a step S4, all the possible combinations are generated between the access managers and the access targets. Namely, the following combinations are obtained.

1) manager 2 and target 1
2) manager 2 and target 2
3) manager 3 and target 1
4) manager 3 and target 2

At a step S5, a location of an organization (e.g., division 1) to which an access manager (e.g., manager 2) belongs is extracted from the organizational-structure information with respect to a particular combination selected from the combinations listed above.

At a step S6, a location of an organization (e.g., division 1) to which an access target (e.g., target 1) belongs is extracted from the organizational-structure information with respect to the selected combination.

At a step S7, the first location obtained at the step S5 and the second location obtained at the step S6 are used for checking the constraint condition. First, a combination of the first location and the second location is as follows.

1) division 1 (manager 2) & division 1 (target 1)

The constraint condition is <location of access manager= location of access target>.

At a step S8, a check is made as to whether the constraint condition is satisfied by the combination 1). In this example, the division 1 of the manager 2 is the same organization as the division 1 of the target 1, so that the constraint condition is satisfied.

At a step S9, since the constraint condition is satisfied, the access-control rule is converted into an access-control list <manager 2, A, target 1>.

At a step S10, a check is made as to whether all the combinations are examined. In this example, all the combinations are not yet examined, so that the procedure goes back to the step S5.

At the step S5, a first location is extracted with regard to an organization (division 1) to which the manager 2 belongs. At a step S6, a second location is extracted with regard to an organization (division 2) to which the target 2 belongs.

At the steps S7 and S8, a check is made as to whether the constraint condition is satisfied by the combination 2). In this example, the division 1 of the manager 2 is not the same organization as the division 2 of the target 2, so that the constraint condition is not satisfied. The step S9 is skipped in this case.

Thereafter, the procedure proceeds in the same manner. As a result, the following four combinations:

1) division 1 (manager 2) & division 1 (target 1)
2) division 1 (manager 2) & division 2 (target 2)
3) division 2 (manager 3) & division 1 (target 1)
4) division 2 (manager 3) & division 2 (target 2)

are screened so as to leave only the following two combinations satisfying the constraint condition.

1) division 1 (manager 2) & division 1 (target 1)
4) division 2 (manager 3) & division 2 (target 2)

In accordance with these two remaining combinations, two access-control lists:

<manager 2, A, target 1>
<manager 3, A, target 2> are generated.

At a step S11, a check is made as to whether all the access control rules are examined. If there is a remaining rule, the procedure goes back to the step S1, where the next rule is input or selected. If no rule remains, the procedure ends.

Figure 9:
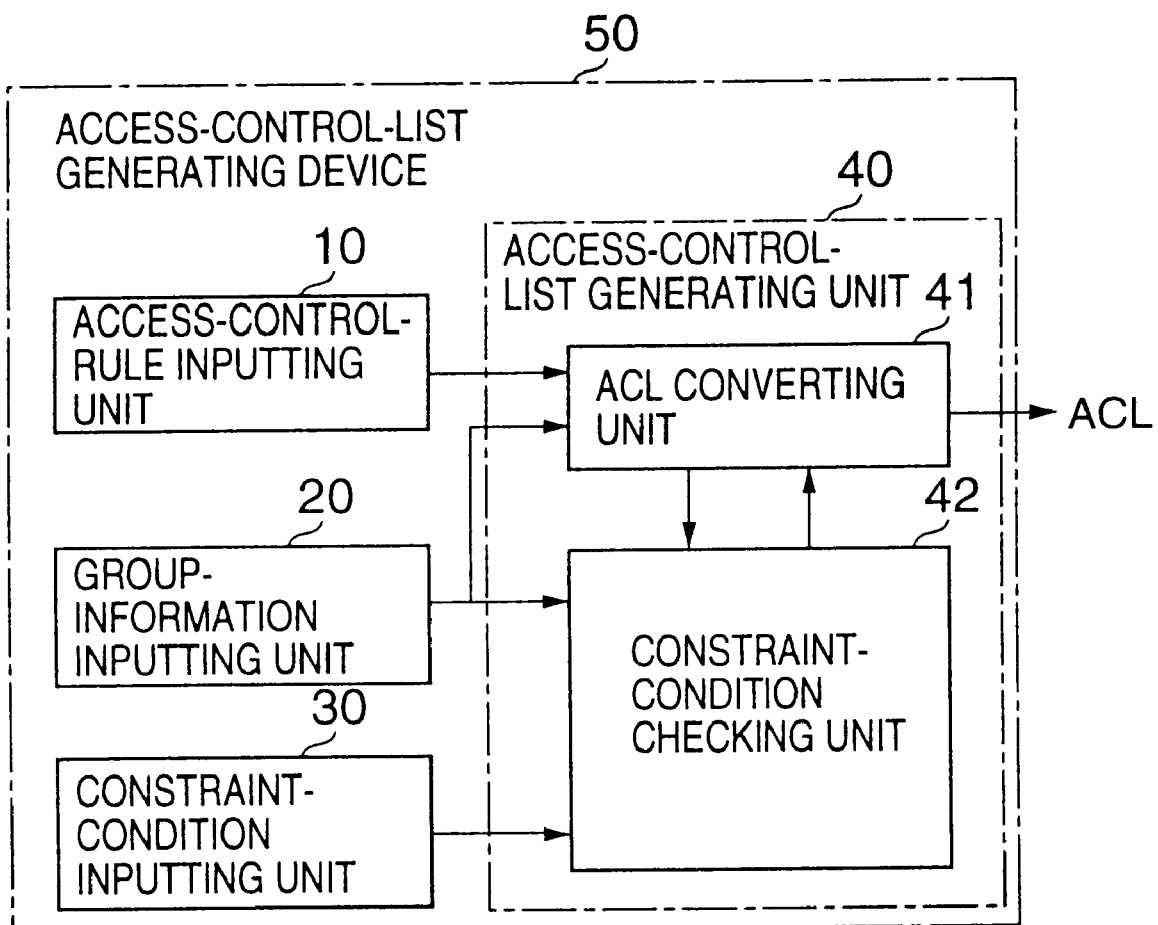
FIG. 9 is a block diagram showing functional elements of a second embodiment of the access-control-list generating device according to the present invention.

FIG. 9 is a block diagram showing functional elements of a second embodiment of the access-control-list generating device according to the present invention. In the figure, the access-control-list generating unit 40 includes the access-control-list converting unit 41 for converting access-control rules provided as input into access-control lists and the constraint-condition checking unit 42 for checking the constraint conditions. Other configurations are the same as those described in connection with FIG. 7.

The access-control-list converting unit 41 extracts information on access managers and information on access targets from the access-manager-type-group information and the access-target-type-group information, respectively, when the access managers and the access targets belong to the access-manager type and the access-target type, respectively, included in the access-control rules. The access-control-list converting unit 41 further requests the constraint-condition checking unit 42 to check the constraint conditions. After these operations, the access-control-list converting unit 41 generates access-control lists, each of which includes three items, i.e., an access manager, an access target, and an action, satisfying the constraint condition.

The constraint-condition checking unit 42 extracts locations of organizations from the organizational-structure information by using the information on the access managers and the information on the access targets when the access managers and/or targets belong to these organizations. Further, the constraint-condition checking unit 42 selects combinations which satisfy the constraint conditions from all the combinations, and notifies the access-control-list converting unit 41 of these selected combinations.

Figure 10A:
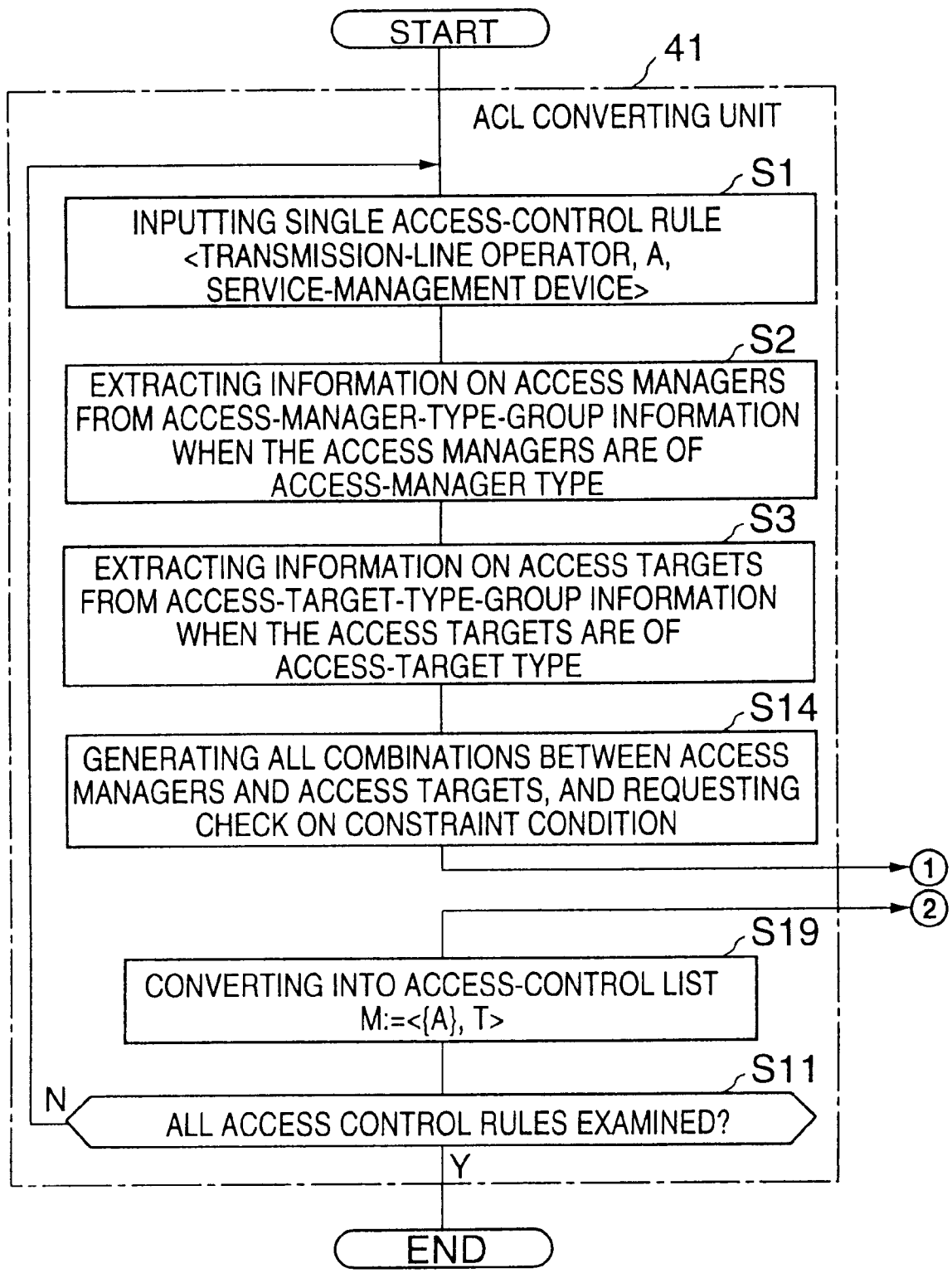
FIGS. 10A and 10B are a flowchart of a process of generating ACLs according to the second embodiment of the present invention.
Figure 10B:
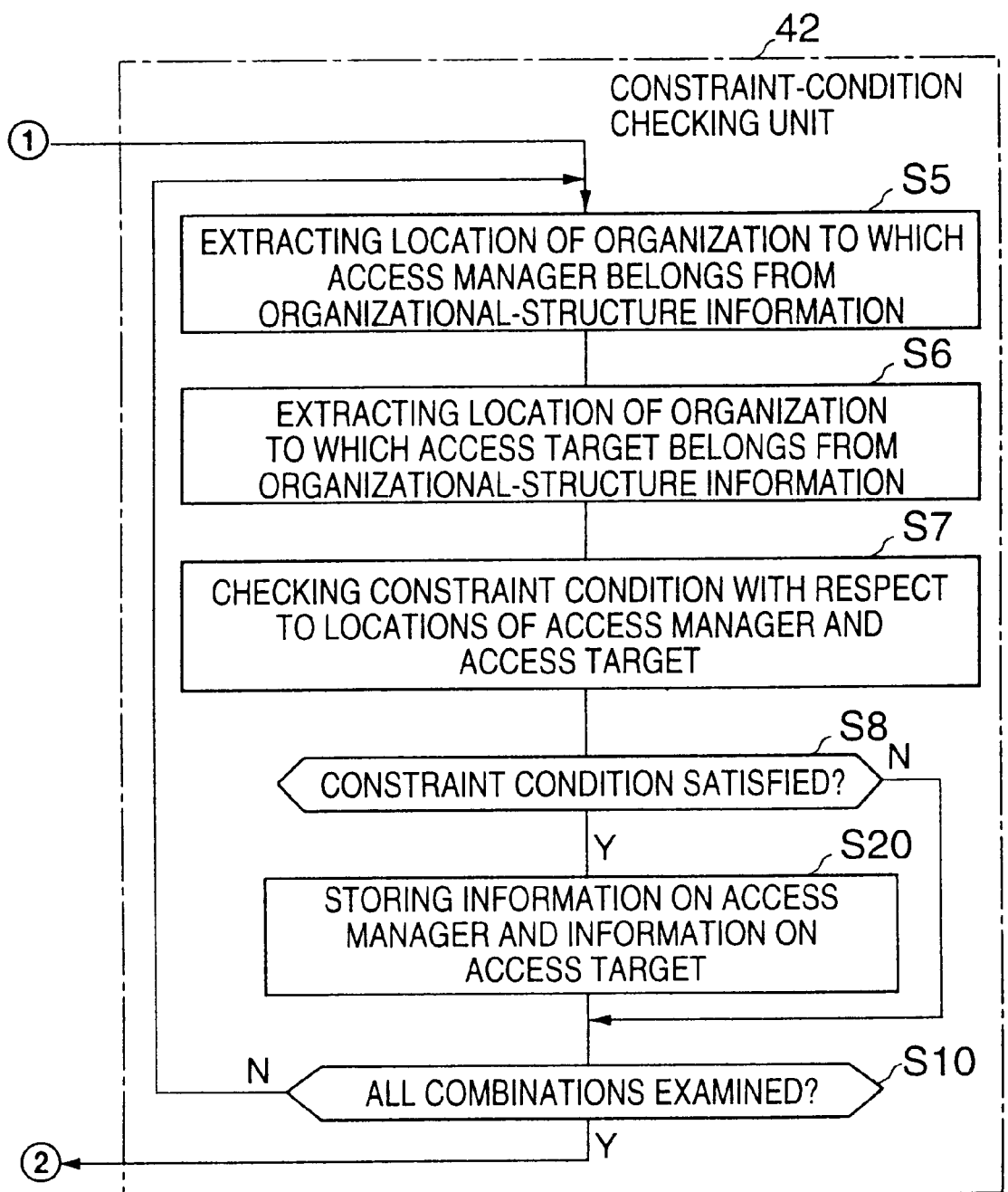

FIGS. 10A and 10B are a flowchart of a process of generating ACLs according to the second embodiment of the present invention. Here, the same steps as those of FIG. 8 are referred to by the same step numbers, and a description thereof will be omitted.

FIG. 10A shows a process performed by the access-control-list converting unit 41.

At a step S14, all the combinations are generated with respect to the access managers obtained at the step S2 and the access targets obtained at the step S3. Further, a request for check on the constraint condition is made to the constraint-condition checking unit 42 along with the data of the combinations. In this example, the following four combinations are generated.

1) manager 2 and target 1
2) manager 2 and target 2
3) manager 3 and target 1
4) manager 3 and target 2

FIG. 10B shows a process performed by the constraint-condition checking unit 42.

At a step S20, information on the access manager and information on the access target are stored in the memory with respect to the combination that satisfies the constraint condition. At the step S10, a check is made as to whether all the combinations are examined. If they are, the procedure goes to a step S19 shown in FIG. 10A.

At the step S19 of FIG. 10A, the access-control rule provided as input is converted into access-control lists by using the access managers and the access targets forming the combinations that satisfy the constraint condition when the information on these access managers and access targets is sent from the constraint-condition checking unit 42. In this example, the following access-control lists are generated as a result of the conversion.

<manager 2, A, target 1>
<manager 3, A, target 2>

FIG. 11 is a block diagram showing functional elements of a third embodiment of the access-control-list generating device according to the present invention. The device of FIG. 11 includes the constraint-condition storage unit 43 which stores a plurality of constraint conditions in advance. Further, the access-control-rule inputting unit 10 has such a configuration as to allow a constraint condition to be specified as part of an access-control rule. The constraint-condition checking unit 42 then checks constraint conditions specified (selected) among the plurality of constraint conditions stored in advance.

Figure 1:
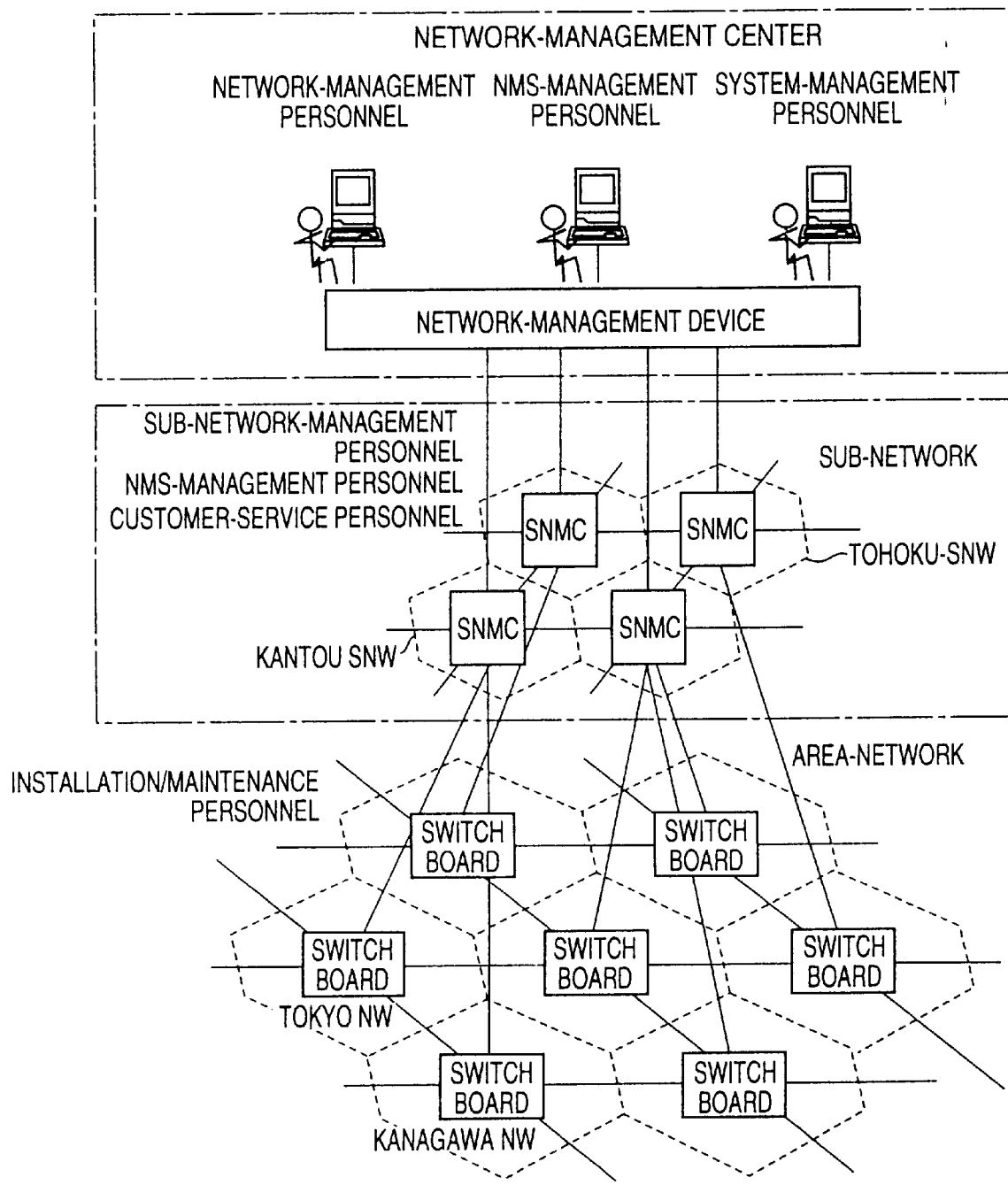
FIG. 1 is an illustrative drawing showing relations between NMS networks and operator responsibilities.
Figures 2A, 2B:
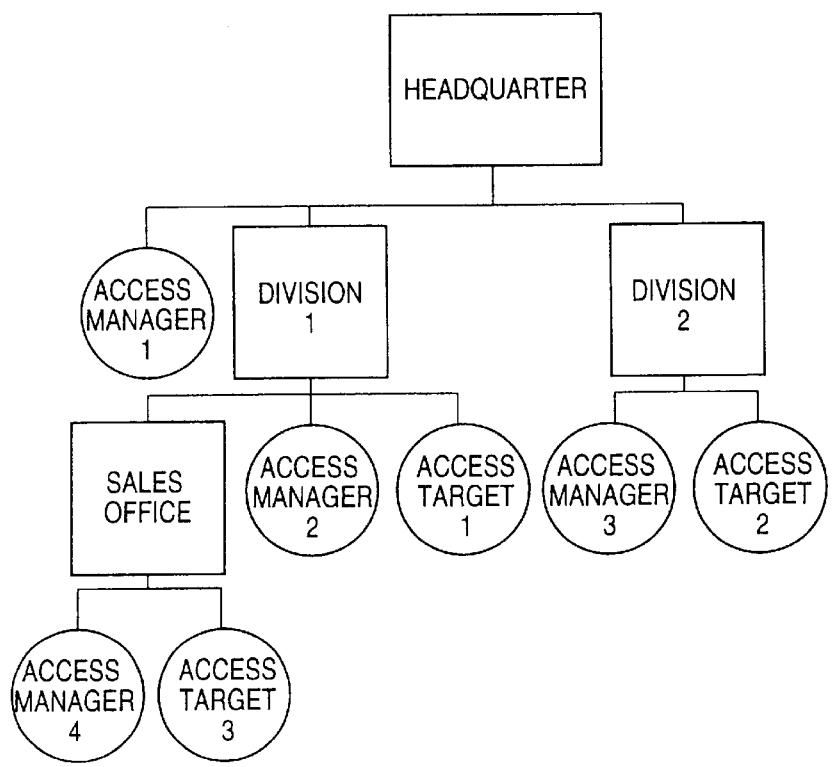
FIG. 2A is a table chart showing access-control guidelines (security guidelines) which forms a basis of access-control rules.
FIG. 2B is an illustrative drawing showing an example of an organizational structure of an NMS network system.
Figure 3:
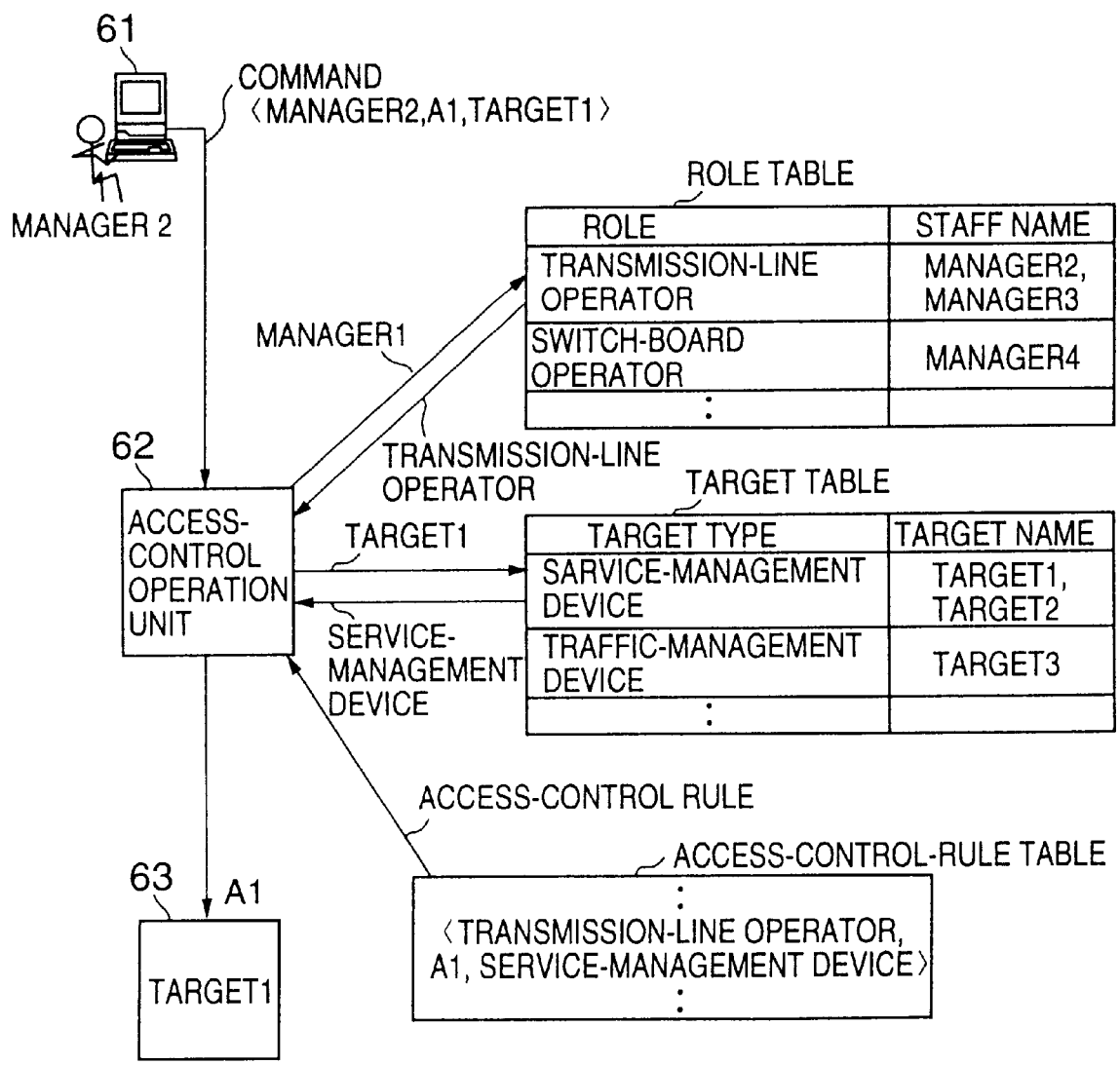
FIG. 3 is an illustrative drawing showing access control based on roles.
Figure 4:
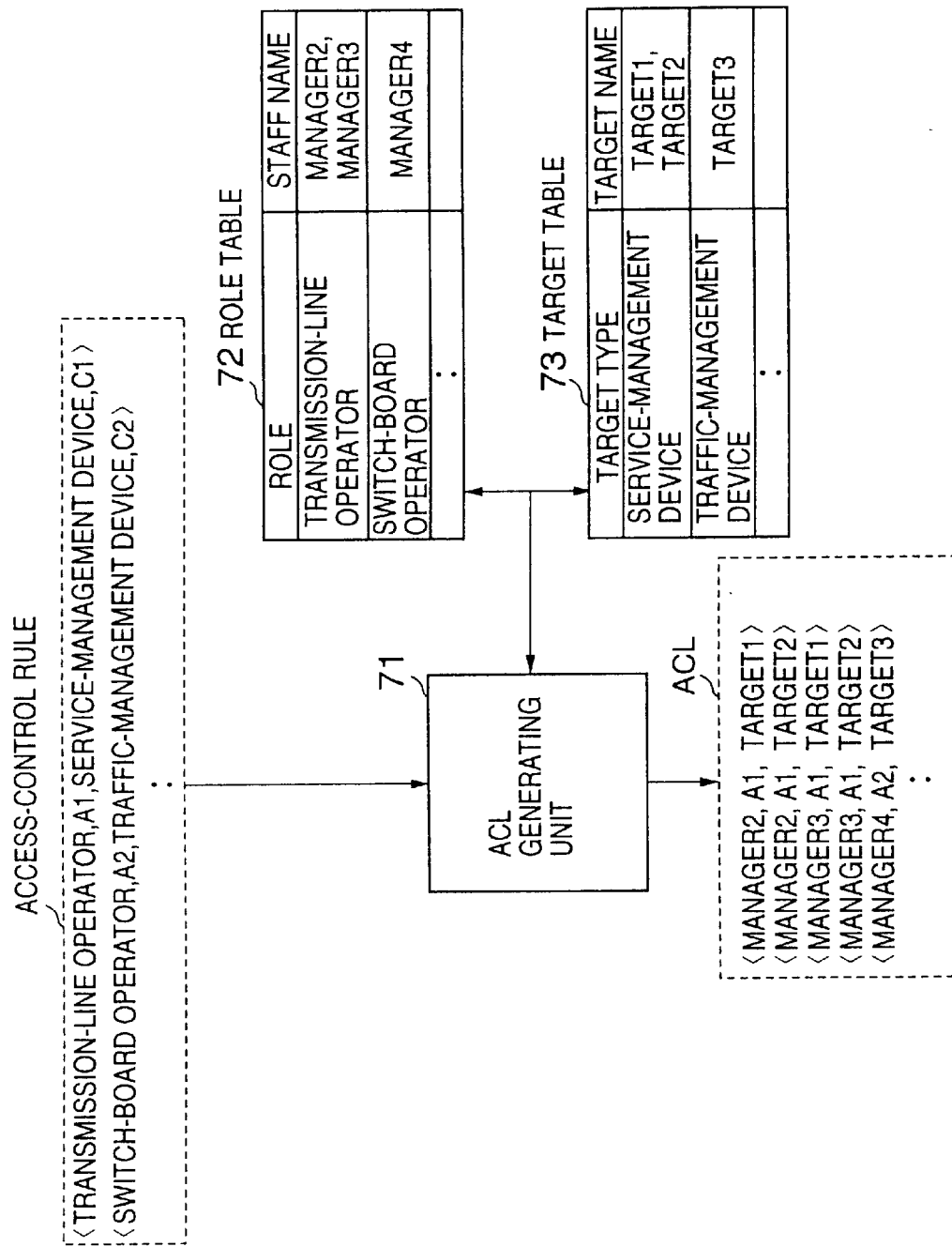
FIG. 4 is an illustrative drawing for explaining an exemplary method of generating an access-control list using roles.

According to the configuration described above, the constraint-condition inputting unit 30 can store a plurality of constraint conditions #0, #1, #2, . . . , in the constraint-condition storage unit 43 in advance. With regard to the access-control guidelines as shown in FIG. 2A, for example, a plurality of constraint conditions A, N, C1, C2, etc., are registered in the constraint-condition storage unit 43, and one of these constraint conditions is specified as part of each access-control rule when it is input. In this manner, access-control lists of the entire system can be readily generated. Moreover, different sets of constraint conditions may be prepared in advance in accordance with different security guidelines, so that various security policies can be easily adopted in the system.

There is a great latitude and flexibility in how to formulate constraint conditions based on roles and an organizational structure (managers, targets, locations, etc) of the system. Exemplary constraint conditions may look like as follows.

constraint condition #0: no constraint
constraint condition #1: an access manager can access an access target only when the access target is controlled by an organization to which the access manager belongs.
constraint condition #2: an access manager can access an access target only when the access target is controlled by an organization subsidiary to the organization of the access manager.

Figure 12A:
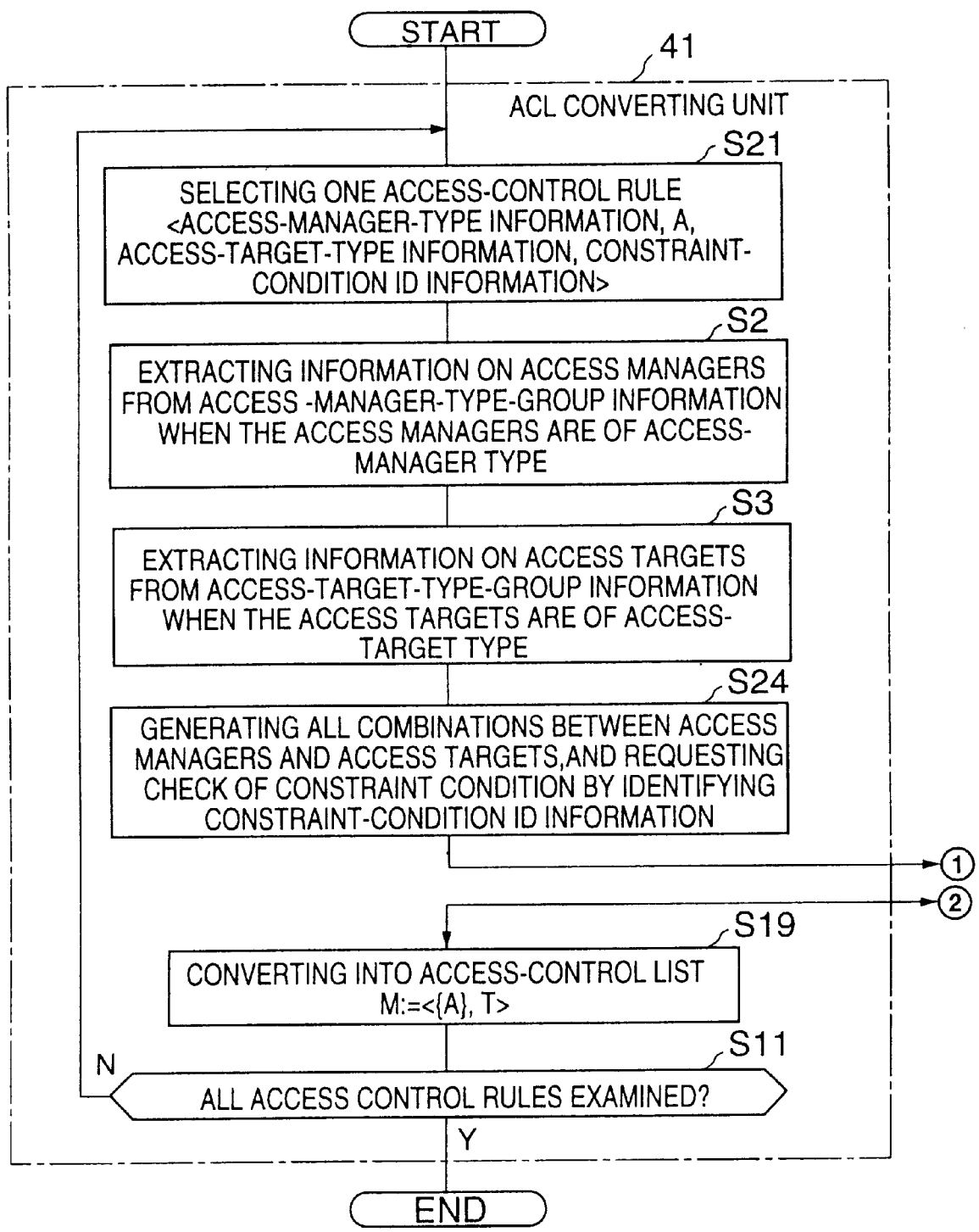
FIGS. 12A and 12B are a flowchart showing a process of generating ACLs according to the third embodiment of the present invention.
Figure 12B:
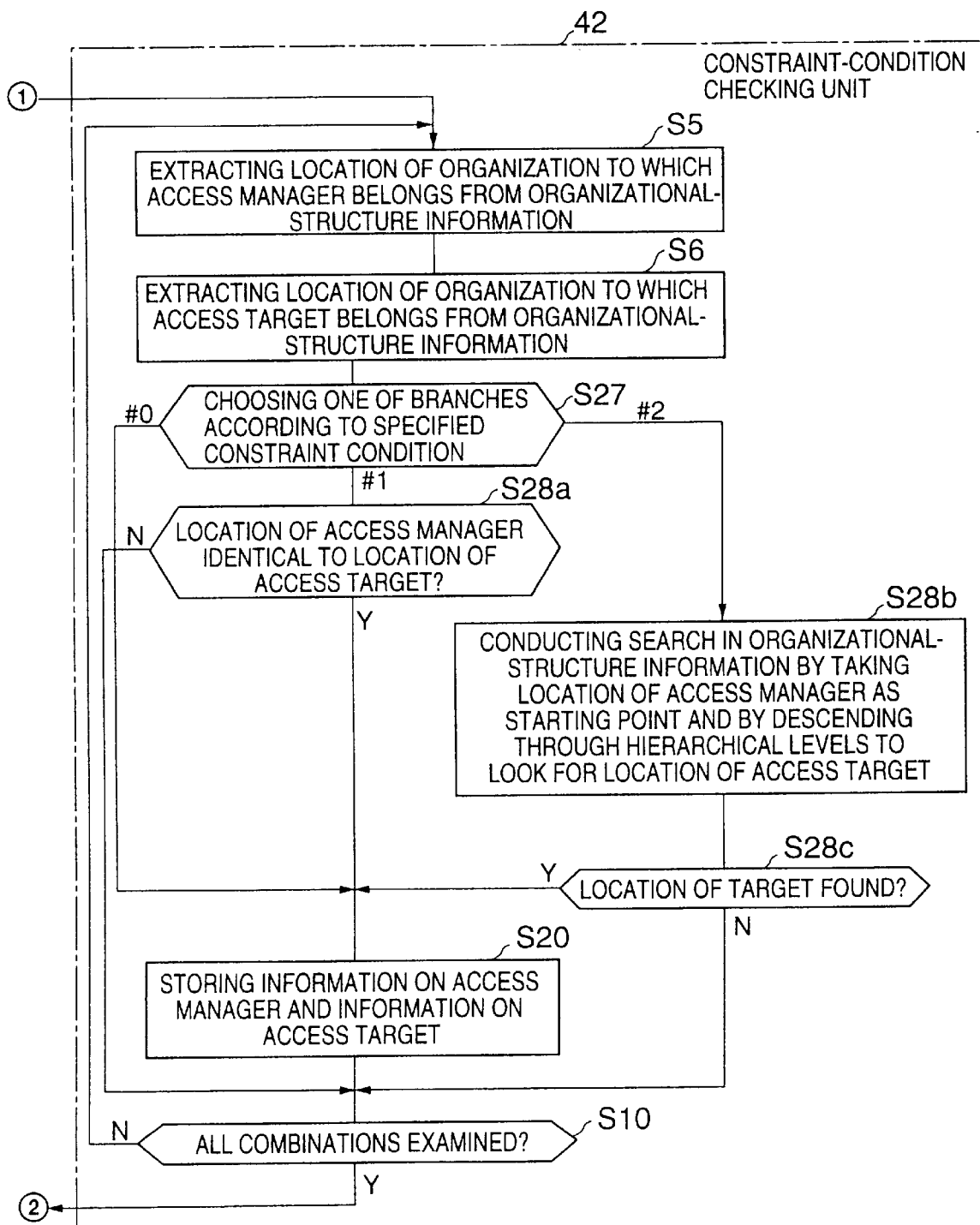

FIGS. 12A and 12B are a flowchart showing a process of generating ACLs according to the third embodiment of the present invention.

FIG. 12A shows a process which is carried out by the access-control-list converting unit 41.

At a step S21, one access-control rule is selected from a list of access-control rules stored in the memory. The selected access-control rule includes identification information #0, #1, #2, etc., indicative of a constraint condition as follows.

<transmission-line operator, A, service-management device, constraint-condition ID information>

At a step S24, all the combinations are generated with respect to the access managers obtained at the step S2 and the access target obtained at the step S3, and a request for check of the constraint condition is issued to the constraint-condition checking unit 42 with data of the combinations and the constraint-condition ID information accompanying the request. In this example, the following combinations may be generated.

1) manager 2 and target 1
2) manager 2 and target 2
3) manager 2 and target 4
   (target 4 is a service-management device belonging to the sales office)
4) manager 3 and target 1
5) manager 3 and target 2
6) manager 3 and target 4

FIG. 12B shows a process which is performed by the constraint-condition checking unit 42.

At a step S27, one of the branches is chosen for the procedure to proceed according to the selected constraint condition.

When the constraint-condition ID information is #0, the procedure goes to the step S20 since there is no imposed constraint. Namely, the current combination of the access manager and the access target is unconditionally stored in the memory.

When the constraint-condition ID information is #1, the procedure goes to a step S28a, where a check is made as to whether the location of the access manager is the same as the location of the access target. If the answer is affirmative, the procedure goes to the step S20. Otherwise, the step S20 is skipped.

When the constraint-condition ID information is #2, the procedure goes to a step S28b, where a search is conducted in the organizational-structure information by taking the location (e.g., division 1) of the access manager (e.g, manager 2) as a starting point and by descending through hierarchical levels to look for a location (the sales office of division 1) of the access target (target 4). At a step S28c, a check is made as to whether the location of the target 4 is found. If it is found, the procedure goes to the step S20. Otherwise, the step S20 is skipped.

In the case of the constraint-condition ID information being #2, the procedure goes to a step S28b, where a search is made for a location (sales office of the division 1) of the access target (target 4) by starting from the location (division 1) of the access manager (manager 2) and going down through hierarchical levels of the organizational structure. At a step S28c, a check is made as to whether the location of the target 4 is found. If it is found, the procedure goes to the step S20. Otherwise, the step S20 is skipped.

When the constraint-condition ID information is #2, the steps S5 and S6 provide the following relation.

3) division 1 (manager 2) & sales office (target 4)

In light of this, a check by using the organizational-structure information may be made with regard to whether the sales office is subsidiary to the division 1, rather than performing the steps S28b and S28c.

Moreover, another constraint condition as follows may be provided.

constraint condition #3: an access manager can access an access target only when the access target is controlled by an organization subsidiary to the organization of the access manager.

Further, an access-control rule may permit more than one description of constraint-condition ID information as in the following, <transmission-line operator, A, service-management device, constraint-condition ID information #1, constraint-condition ID information #2> and the constraint-condition checking unit 42 may be configured to check a plurality of constraint conditions accordingly. In this case, specifying both the constraint-condition ID information #1 and the constraint-condition ID information #2 results in the same access-control lists as those generated when the constraint-condition ID information #3 is specified.

Figure 13:
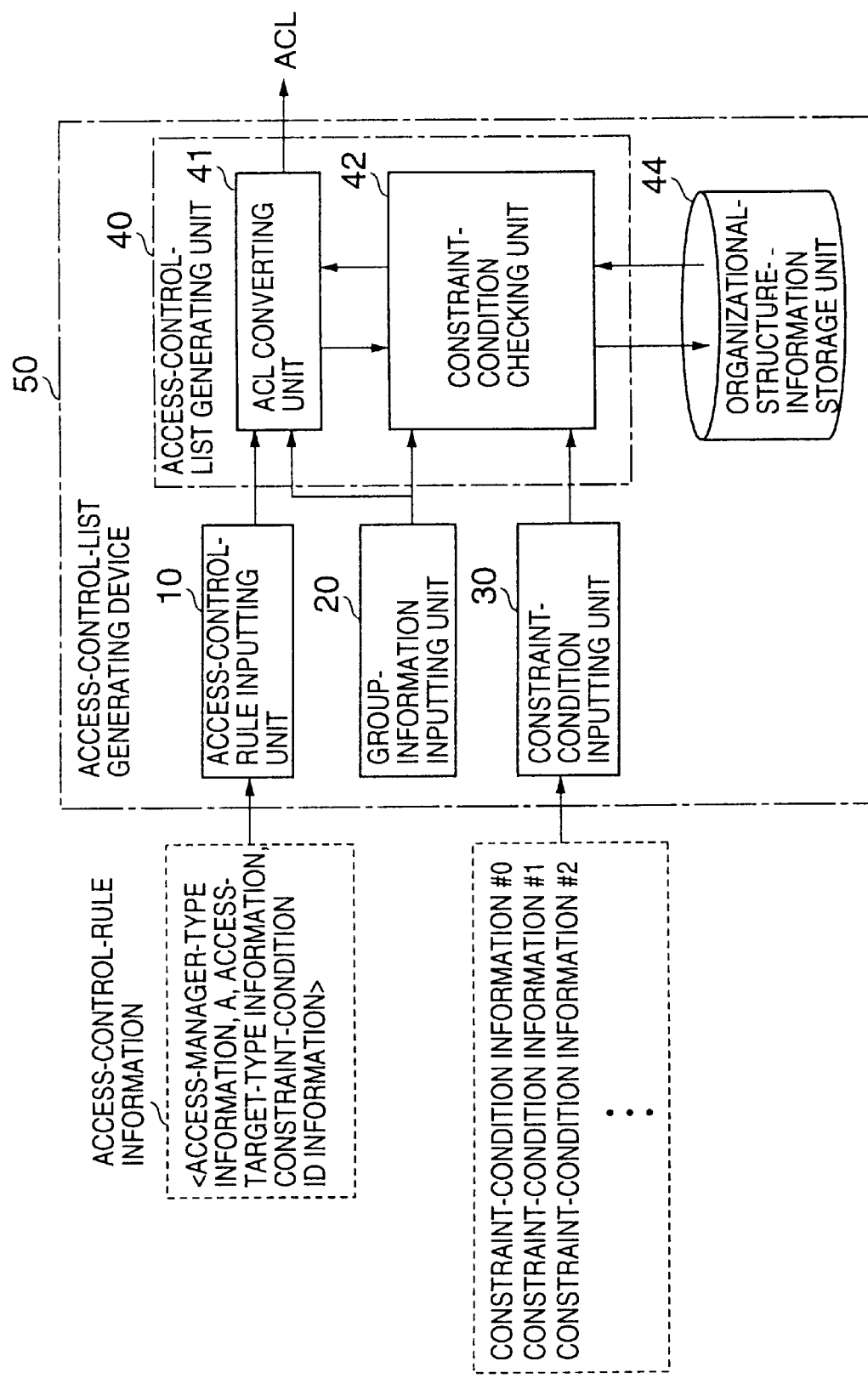
FIG. 13 is a block diagram showing functional elements of a fourth embodiment of the access-control-list generating device according to the present invention.

FIG. 13 is a block diagram showing functional elements of a fourth embodiment of the access-control-list generating device according to the present invention. The device of FIG. 13 includes the organizational-structure-information storage unit 44 which stores a plurality of organizational structures in advance. Further, the access-control-rule inputting unit 10 has such a configuration as to allow an organizational structure to be specified as part of an access-control rule. The constraint-condition checking unit 42 then checks constraint conditions in accordance with the specified organizational structures.

Namely, a plurality of organizational structures #0, #1, #2, and so on may be stored beforehand in the organizational-structure-information storage unit 44 by the group-information inputting unit 20.

For example, other organizational structures #1, #2, and so on with regard to operation systems are stored in the organizational-structure-information storage unit 44 in addition to the organizational structure #0 shown in FIG. 7, and these organizational structures may be specified as part of access-control rules, thereby allowing access-control lists to be generated for various systems. Also, when the organizational structure #0 is highly complex, for example, the organizational structure may be divided vertically and/or horizontally such as into headquarter—division 1 and headquarter—division 2 or headquarter—division and division—sales office. Then, divided parts are identified as organizational structures #0a, #0b, and so on. This makes it possible to easily deal with a highly complex organizational structure. Another advantage is that this makes it easier to create security guidelines (access-control rules).

Figure 14A:
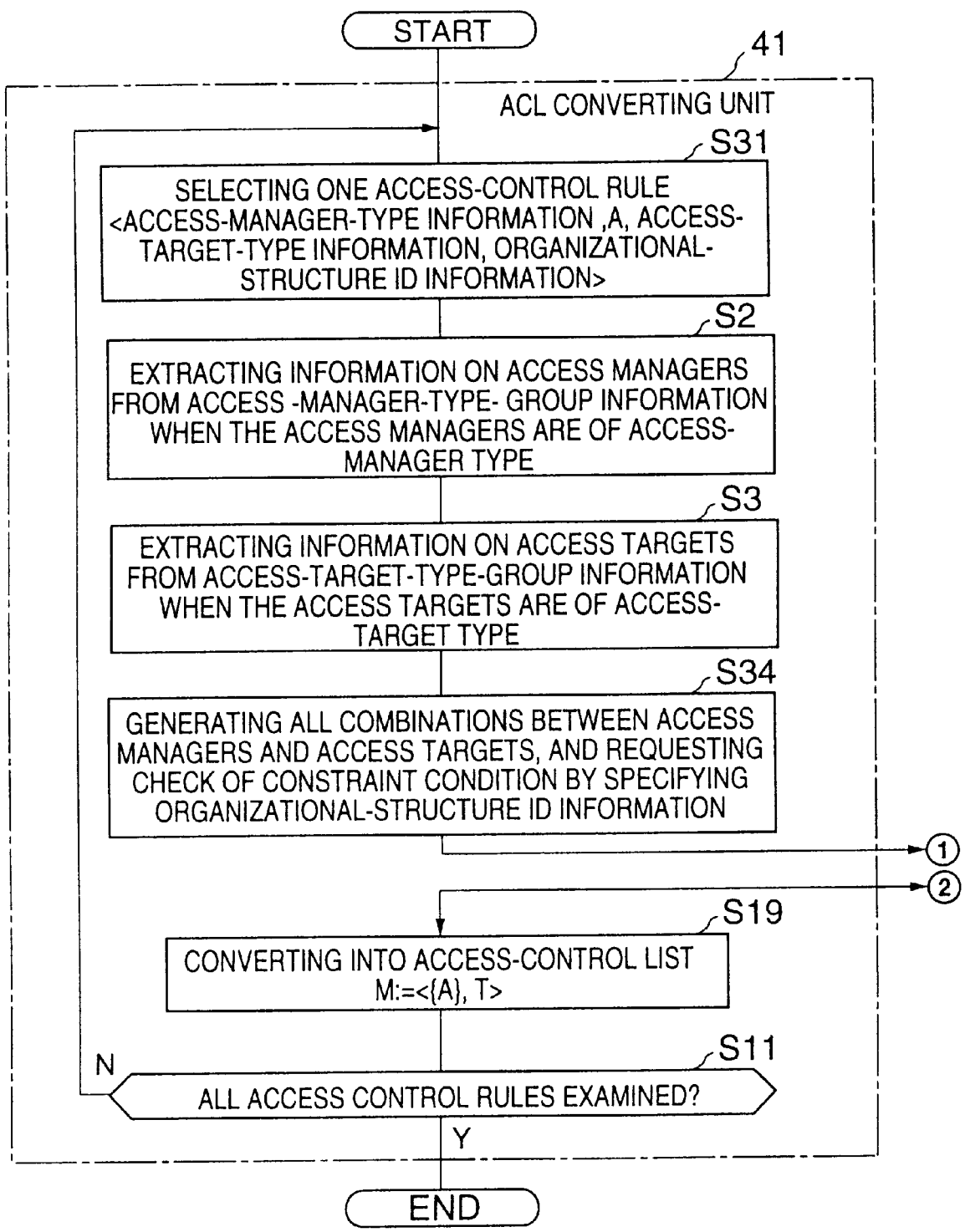
FIGS. 14A and 14B are a flowchart of a process of generating ACLs according to the fourth embodiment.
Figure 14B:
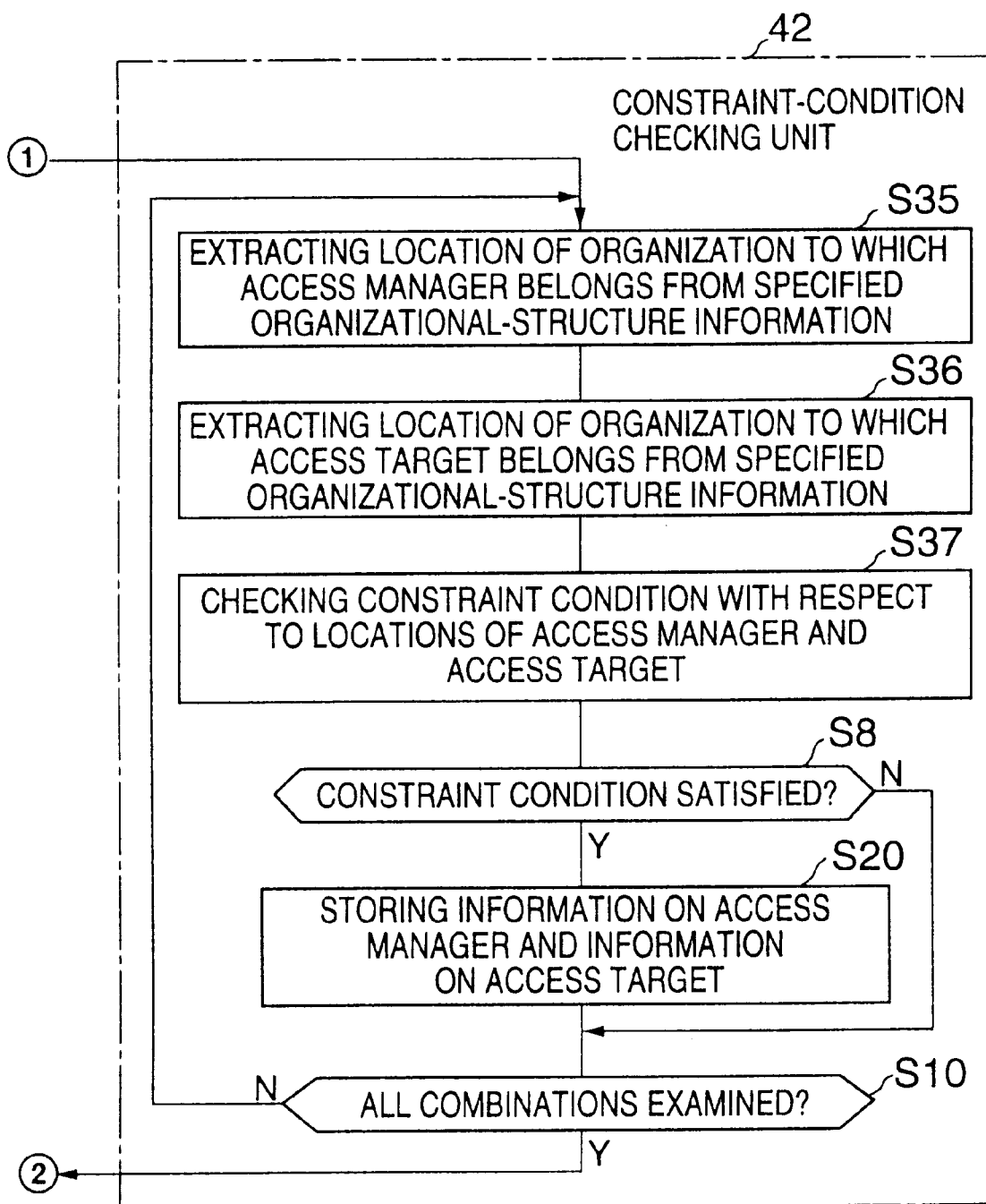

FIGS. 14A and 14B are a flowchart of a process of generating ACLs according to the fourth embodiment.

FIG. 14A shows a process performed by the access-control-list converting unit 41.

At a step S31, one access-control rule is selected from a list of access-control rules stored in the memory. The selected access-control rule includes identification information #0, #1, #2, etc., specifying an organizational structure as in the following.

<transmission-line operator, A, service-management device, organizational-structure ID information>

At a step S34, the access managers obtained at the step S2 and the access targets obtained at the step S3 are used for generating all the possible combinations thereof, and a request for check of a constraint condition is issued to the constraint-condition checking unit 42 with data of the combinations and the organizational structure ID information accompanying the request.

FIG. 14B shows a process performed by the constraint-condition checking unit 42.

At a step S35, a location of an organization to which an access manager belongs is extracted from specified organizational-structure information with respect to a combination selected from the combinations described above.

At a step S6, a location of an organization to which an access target belongs is extracted from the specified organizational-structure information with respect to the selected combination.

At a step S37, the first location obtained at the step S35 and the second location obtained at the step S36 are used for checking the constraint condition.

In this configuration, the constraint-condition checking unit 42 may be configured to process a plurality of constraint conditions as well as allowing a plurality of descriptions of organizational structure ID information to be given as part of an access-control rule. This makes it possible to generate ACLs at once for a plurality of NMSs or generate ACLs at once for a plurality of divided parts of a single NMS.

In the above configuration, the organizational structure ID information was attached to an access-control rule. Alternatively, a unit for selecting an organizational structure may be separately provided, allowing an organizational structure to be selected.

Figure 15:
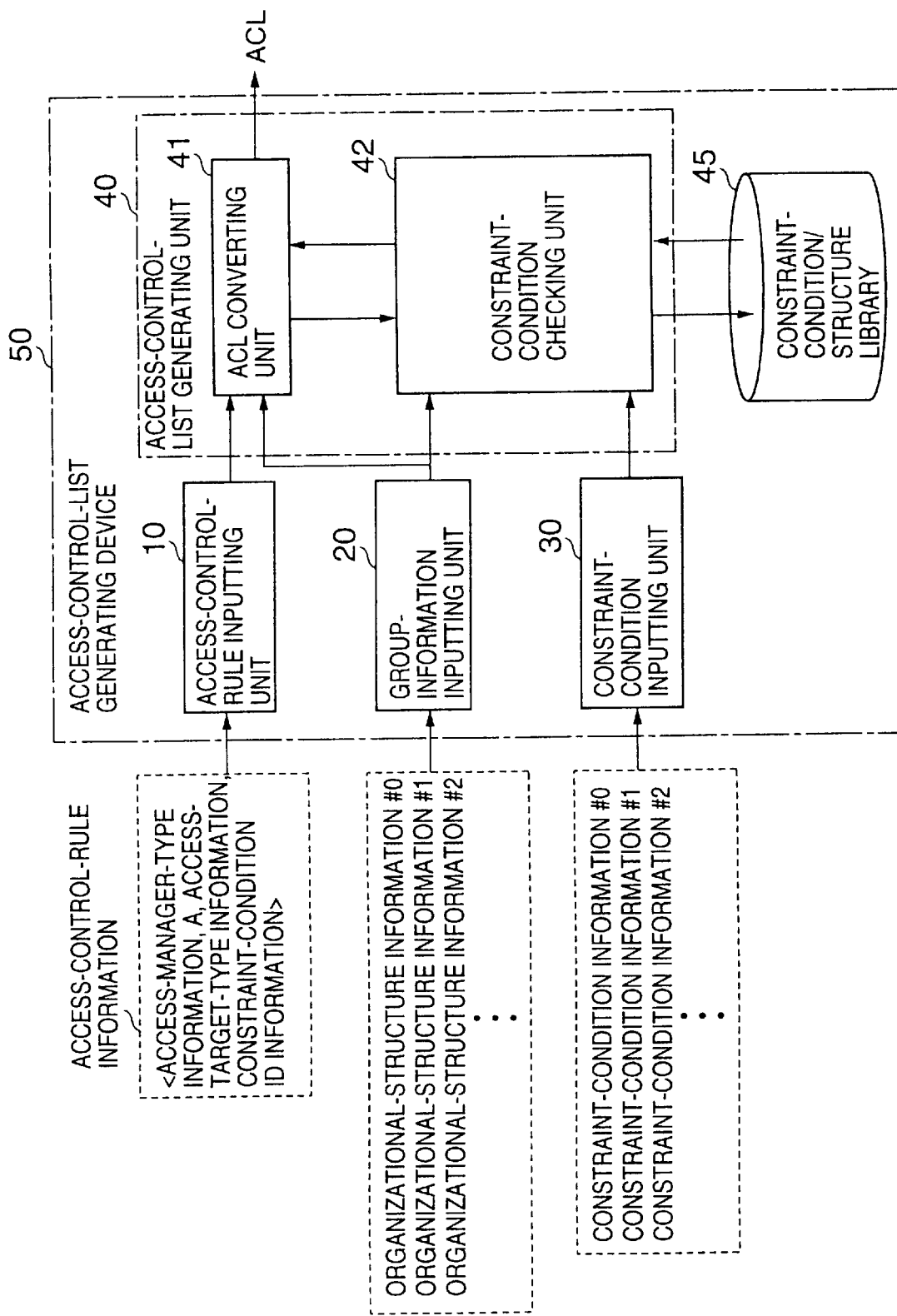
FIG. 15 is a block diagram showing functional elements of a fifth embodiment of the access-control-list generating device according to the present invention.

FIG. 15 is a block diagram showing functional elements of a fifth embodiment of the access-control-list generating device according to the present invention. The device of FIG. 15 includes a constraint-condition/structure library 45 which stores a plurality of constraint conditions and organizational structures in advance. Further, the access-control-rule inputting unit 10 has such a configuration as to allow a constraint condition and an organizational structure to be specified as part of an access-control rule. The constraint-condition checking unit 42 then checks the specified constraint condition in accordance with the specified organizational structure. This configuration can easily cope with highly complicated security guidelines and complex organizational structures.

The configuration of the fifth embodiment can be implemented by combining together the third and fourth embodiments, and a detailed description thereof will be omitted.

Figure 16:
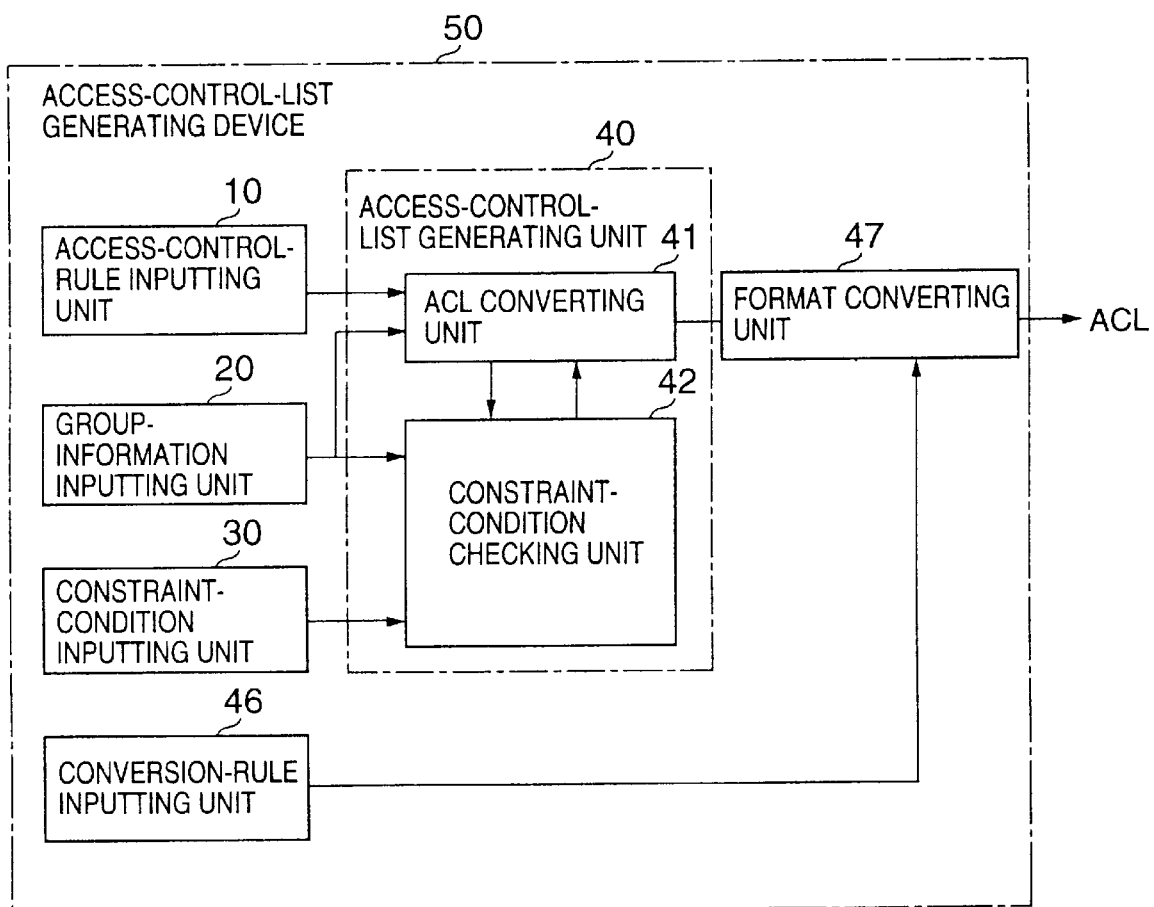
FIG. 16 is a block diagram showing functional elements of a sixth embodiment of the access-control-list generating device according to the present invention.

FIG. 16 is a block diagram showing functional elements of a sixth embodiment of the access-control-list generating device according to the present invention. The device of FIG. 16 includes the conversion-rule inputting unit 46 and the format converting unit 47. The conversion-rule inputting unit 46 stores format-conversion rules of access-control lists in the memory, and the format converting unit 47 converts the format of access-control lists generated by the access-control-list generating unit 40 by using the format-conversion rules stored in the memory. Other configurations are the same as the previous embodiments.

Figure 17:
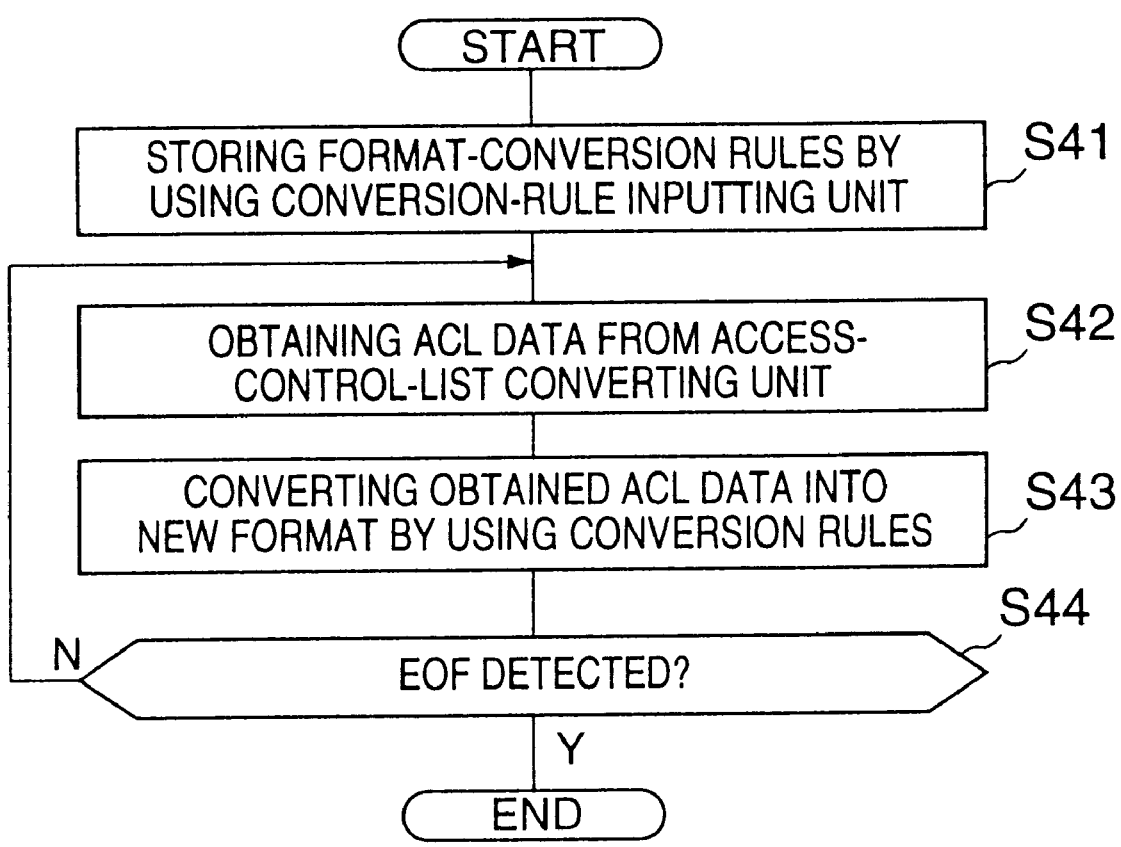
FIG. 17 is a flowchart of a process of converting a format according to the sixth embodiment of the present invention.

FIG. 17 is a flowchart of a process of converting a format according to the sixth embodiment of the present invention.

At a step S41, format-conversion rules are stored in the memory by the conversion-rule inputting unit 46. At a step S42, ACL data is obtained from the access-control-list converting unit 41. At a step S43, the obtained ACL data is converted into a new format by using the conversion rules. At a step S44, a check is made whether an EOF is detected from the obtained data. If no EOF is detected, the procedure goes back to the step S42 to obtain next ACL data. Otherwise, the procedure ends.

In the following, an example of a format conversion of ACL data will be given.

A format of access-control lists output from the access-control-list converting unit 41 may be as follows.

<M1, A, T1>[return]
<M2, A, T3>[return]
[EOF]

On the other hand, a format of access-control lists which is in compliance with the system requirement is, for example, as follows.

{M1, A, T1}, {M2, A, T3} [return]
[EOF]

In this case, format-conversion rules would be defined as follows.

| (Before) | → | (After) |
|---|---|---|
| < | → | { |
| > | → | } |
| [return] | → | , |
| [EOF] | → | [backspace] + [return] + [EOF] |

In this manner, access-control lists having an appropriate format can be supplied to the access-control operation unit 62 so as to insure that the supplied access-control lists are interpreted and executed without problems even when there are various access-control operation units 62 requiring different access-control-list formats in a distributed system.

Alternatively, a unit for storing different sets of format-conversion rules in advance may be provided, and a particular set of format-conversion rules may be selected as part of an access-control rule by the access-control-rule inputting unit 10 or may be selected by an external selection unit. Further, when access-control lists are generated, a format of the access-control lists output from the access-control-list converting unit 41 is converted according to the specified set of format-conversion rules.

As described above, the present invention employs data definitions (group information) which provide a concise model representing how a person making the rules perceives a system, and further employs a configuration in which constraint conditions regarding access authorizations are taken care by the system. This allows rules to be generated in an intuitively-driven manner.

Further, when changes/modifications are made to the access-control-target system or to the access policies, revision needs to be made only with respect to data portions corresponding to the changes. This significantly reduces the load of making/changing access-control rules.

Further, the present invention is not limited to these embodiments, but various variations and modifications may be made without departing from the scope of the present invention.

What is claimed is:

1. A method of generating access-control lists executable by a system and derived from access-control rules supplied for insuring security of an operation system, said method comprising the steps of:

a) inputting, in a memory, access-manager-type-group information which defines relations between access managers of the system and access-manager types, access-target-type-group information which defines relations between access targets of the system and access-target types, and organizational-structure information which defines an organizational structure of the system encompassing organizations to which the access managers and the access targets belong;

b) inputting, in the memory, access-control rules, each of which is comprised of an access-manager type, an access-target type, and an action in order to represent security guidelines of the system;

c) inputting, in the memory, constraint conditions relating to the organizational structure of the system;

d) extracting access managers and access targets from the access-manager-type-group information and the access-target-type-group information, respectively, with respect to the access-manager type and the access-target type included in each of the access-control rules;

e) extracting, from the organizational-structure information, first locations of first organizations and second locations of second organizations to which the extracted access managers and the extracted access targets belong, respectively;

f) checking the constraint conditions with regard to all combinations between the first locations and the second locations; and g) generating access-control lists which are comprised of such an access manager, an access target, and an action as to satisfy the constraint conditions.

2. A device for generating access-control lists executable by a system and derived from access-control rules supplied for insuring security of an operation system, said device comprising:

a group-information inputting unit which inputs, in a memory, access-manager-type-group information defining relations between access managers of the system and access-manager types, access-target-type-group information defining relations between access targets of the system and access-target types, and organizational-structure information defining an organizational structure of the system encompassing organizations to which the access managers and the access targets belong;

an access-control rule inputting unit which inputs, in the memory, access-control rules, each of which is comprised of an access-manager type, an access-target type, and an action in order to represent security guidelines of the system;

a constraint-condition inputting unit which inputs, in the memory, constraint conditions relating to the organizational structure of the system;

an access-control-list generating unit which extracts access managers and access targets from the access-manager-type-group information and the access-target-type-group information, respectively, with respect to the access-control rules, and checks the constraint conditions with regard to all combinations between the extracted access managers and the extracted access targets so as to generate access-control lists comprised of such an access manager, an access target, and an action as to satisfy the constraint conditions.

3. The device as claimed in claim 2, wherein said access-control-list generating unit includes:

an access-control-list converting unit which extracts access managers and access targets from the access-manager-type-group information and the access-target-type-group information, respectively, such that the extracted access managers and the extracted access targets belong to the access-manager type and the access-target type, respectively, included in each of the access-control rules, and generates access-control lists comprised of such an access manager, an access target, and an action as to satisfy the constraint conditions; and a constraint-condition checking unit which extracts, from the organizational-structure information, first locations of first organizations and second locations of second organizations to which the extracted access managers and the extracted access targets belong, respectively, and checks the constraint conditions with regard to all combinations between the first locations and the second locations so as to select combinations satisfying the constraint conditions and inform said access-control-list converting unit of the selected combinations.

4. The device as claimed in claim 2, further comprising a constraint-condition storing unit which stores a plurality of constraint conditions in advance, wherein said access-control-list inputting unit allows the constraint conditions stored in advance to be specified as part of the access-control rules, the constraint conditions so specified being checked.

5. The device as claimed in claim 2, further comprising a constraint-condition storing unit which stores a plurality of organizational structures in advance, wherein said access-control-list inputting unit allows the organizational structures stored in advance to be specified as part of the access-control rules, the constraint conditions being checked with respect to the organizational structures so specified.

6. The device as claimed in claim 2, further comprising:
 a conversion-rule inputting unit which inputs format-conversion rules of the access-control lists in the memory; and
 a format converting unit which converts a format of the access-control lists generated by the access-control-list generating unit according to the format-conversion rules stored in the memory.

* * * * *